United States Patent
Huber et al.

(10) Patent No.: US 9,410,835 B2
(45) Date of Patent: *Aug. 9, 2016

(54) MEASURING TRANSDUCER OF VIBRATION-TYPE WITH FOUR CURVED MEASURING TUBES

(71) Applicant: Endress + Hauser Flowtec AG, Reinach (CH)

(72) Inventors: Christof Huber, Bern (CH); Ennio Bitto, Aesch (CH); Marcel Braun, Inzlingen (DE); Alfred Rieder, Landshut (DE); Christian Schutze, Basel (CH)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 12 days.

This patent is subject to a terminal disclaimer.

(21) Appl. No.: 14/242,059

(22) Filed: Apr. 1, 2014

(65) Prior Publication Data

US 2014/0352454 A1 Dec. 4, 2014

Related U.S. Application Data

(63) Continuation of application No. 12/971,515, filed on Dec. 17, 2010, now Pat. No. 8,695,436, and a continuation of application No. 12/970,072, filed on Dec. 16, 2010, now Pat. No. 8,613,227.

(60) Provisional application No. 61/344,561, filed on Aug. 20, 2010, provisional application No. 61/282,132, filed on Dec. 22, 2009.

(51) Int. Cl.
*G01F 1/84* (2006.01)

(52) U.S. Cl.
CPC *G01F 1/849* (2013.01); *G01F 1/84* (2013.01); *G01F 1/8413* (2013.01); *G01F 1/8477* (2013.01)

(58) Field of Classification Search
CPC .......................................... G01F 1/84

USPC .................... 73/861.355–861.357
See application file for complete search history.

(56) References Cited

U.S. PATENT DOCUMENTS

| 4,879,910 A | 11/1989 | Lew |
| 5,048,349 A | 9/1991 | Wolff |
| 5,230,254 A | 7/1993 | Craft |
| 5,969,264 A | 10/1999 | Rivkin |
| 9,052,224 B2 * | 6/2015 | Rieder .................. G01F 1/8413 |

FOREIGN PATENT DOCUMENTS

| DE | 102004035971 A1 | 2/2006 |
| DE | 102009001472 A1 | 9/2010 |

(Continued)

OTHER PUBLICATIONS

English translation of IPR, Jul. 19, 2012, WIPO, Geneva Switzerland.

*Primary Examiner* — Jewel V Thompson

(74) *Attorney, Agent, or Firm* — Bacon & Thomas, PLLC

(57) ABSTRACT

The measuring transducer comprises: a transducer housing ($7_1$), of which an inlet-side, housing end is formed by means of an inlet-side, flow divider ($20_1$) having four flow openings ($20_{1A}$, $20_{1B}$, $20_{1C}$, $20_{1D}$) and an outlet-side, housing end is formed by means of an outlet-side, flow divider ($20_2$) having four flow openings ($20_{2A}$, $20_{2B}$, $20_{2C}$, $20_{2D}$); as well as a tube arrangement having four, curved, or bent, measuring tubes ($18_1$, $18_2$, $18_3$, $18_4$) connected to the flow dividers ($20_1$, $20_2$) for guiding flowing medium along flow paths connected in parallel, wherein each of the four measuring tubes opens with an inlet-side, measuring tube end into one of the flow openings of the flow divider ($20_1$) and with an outlet-side, measuring tube end into one the flow openings of the flow divider ($20_2$). The transducer further comprises an exciter mechanism for exciting oscillations of said measuring tube. The tube arrangement exhibits a natural bending oscillation mode, called V-Mode, and the exciter mechanism is adapted to excite bending oscillation in said V-mode.

21 Claims, 10 Drawing Sheets

(56) References Cited

FOREIGN PATENT DOCUMENTS

Figure 1:
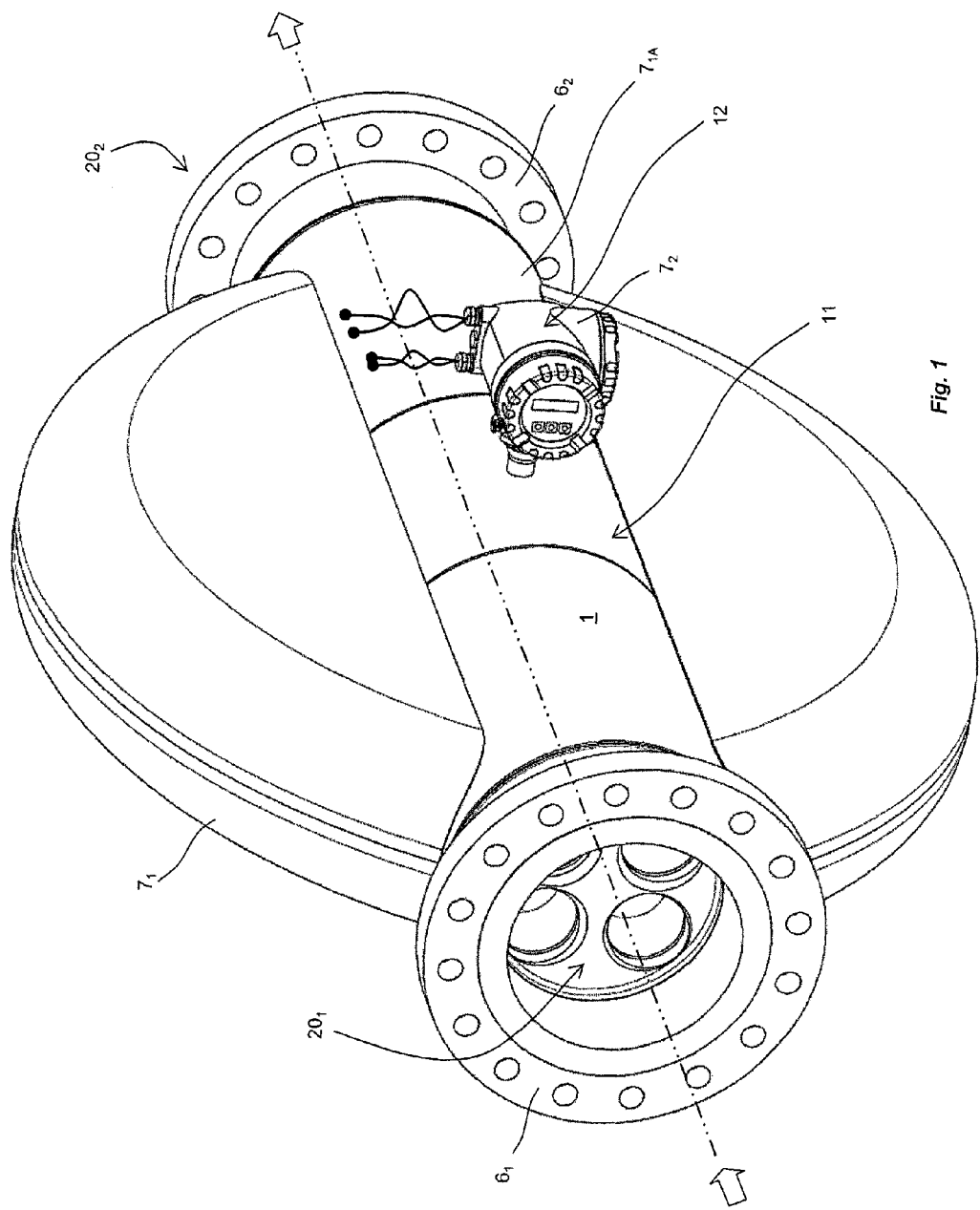

| EP | 0119638 | A1 | 9/1984 |
| WO | 9608697 | A2 | 3/1996 |
| WO | 2006010687 | A1 | 2/2006 |
| WO | 2010102999 | A1 | 9/2010 |

* cited by examiner

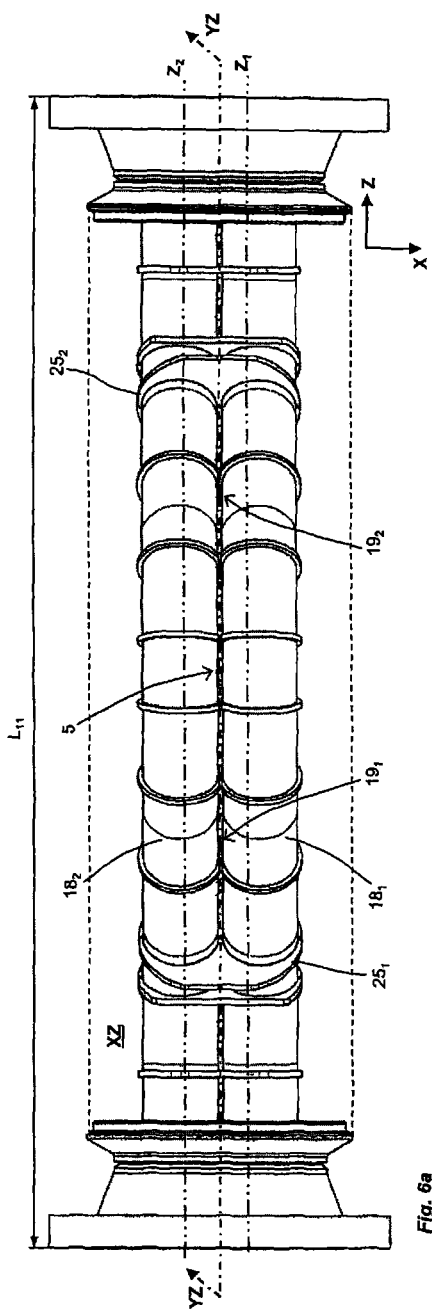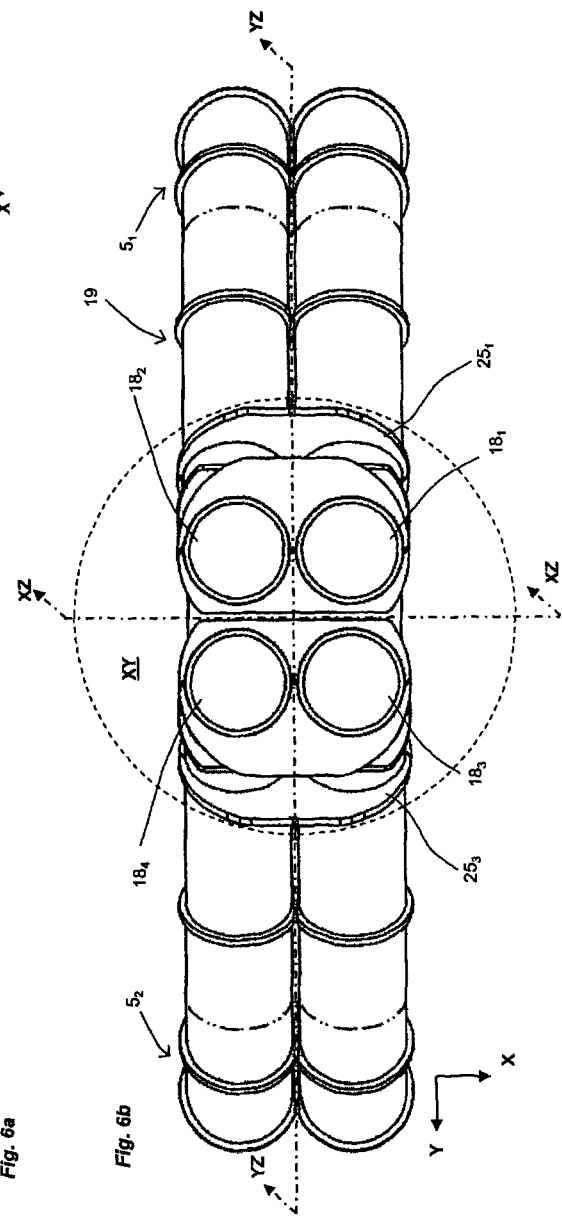
Fig. 6a
Fig. 6b

MEASURING TRANSDUCER OF VIBRATION-TYPE WITH FOUR CURVED MEASURING TUBES

CROSS-REFERENCE TO RELATED APPLICATION

This application is a Continuation of U.S. patent application Ser. No. 12/971,515 filed on Dec. 17, 2010, which claims the benefit of U.S. Provisional Application 61/344,561 filed on Aug. 20, 2010; and also U.S. patent application Ser. No. 12/970,072 filed on Dec. 21, 2009 which claims the benefit of U.S. Provisional Application 61/282,132 filed on Dec. 22, 2009 and claims the benefit of German Application DE 10 2010 039 627.3 filed on Aug. 20, 2010 and German Application DE 10 2009 055 069.0 filed on Dec. 21, 2009.

The invention relates to a measuring transducer of vibration-type for measuring a medium flowably guided in a pipeline, especially a gas, liquid, powder or other flowable material, especially for measuring a density and/or a mass flow rate, especially also a mass flow integrated over a time interval, of a medium flowing in a pipeline, at least at times, with a mass flow rate of more than 1000 t/h, especially more than 1500 t/h. Additionally, the invention relates to a measuring system having such a measuring transducer, especially a measuring system embodied in the form of an in-line measuring device.

Often used in process measurements, and automation, technology for measuring physical parameters, such as e.g. the mass flow, the density and/or the viscosity, of media, for instance, an aqueous liquid, a gas, a liquid-gas-mixture, a vapor, an oil, a paste, a slurry or another flowable material, flowing in pipelines are in-line measuring devices, which, by means of a measuring transducer of vibration-type, through which medium flows, and a measuring, and operating, circuit connected thereto, effect, in the medium, reaction forces, such as e.g. Coriolis forces corresponding with mass flow, inertial forces corresponding with density of the medium and/or frictional forces corresponding with viscosity of the medium, etc., and produce derived from these a measurement signal representing the particular mass flow, viscosity and/or density of the medium. Such measuring transducers, especially measuring transducers embodied as Coriolis, mass flow meters or Coriolis, mass flow/densimeters, are described at length and in detail e.g. in EP-A 1 001 254, EP-A 553 939, U.S. Pat. No. 4,793,191, US-A 2002/0157479, US-A 2006/0150750, US-A 2007/0151368, U.S. Pat. Nos. 5,370,002, 5,796,011, 6,308,580, 6,415,668, 6,711,958, 6,920,798, 7,134,347, 7,392,709, or WO-A 03/027616.

Each of the measuring transducers includes a transducer housing, of which an inlet-side, first housing end is formed at least partially by means of a first flow divider having exactly two, mutually spaced, circularly cylindrical, or tapered or conical, flow openings and an outlet-side, second housing end is formed at least partially by means of a second flow divider having exactly two, mutually spaced, flow openings. In the case of some of the measuring transducers illustrated in U.S. Pat. Nos. 5,796,011, 7,350,421, or US-A 2007/0151368, the transducer housing comprises a rather thick walled, circularly cylindrical, tubular segment, which forms at least a middle segment of the transducer housing.

For guiding the medium, in given cases, also an extremely hot, medium, which flows, at least at times, the measuring transducers include, furthermore, in each case, exactly two measuring tubes of metal, especially steel or titanium, which are connected such that the medium can flow in parallel and which are positioned within the transducer housing and held oscillatably therein by means of the aforementioned flow dividers. A first of the, most often, equally constructed and, relative to one another, parallel extending, measuring tubes opens with an inlet-side, first, measuring tube end into a first flow opening of the inlet-side, first flow divider and with an outlet-side, second measuring tube end into a first flow opening of the outlet-side, second flow divider and a second of the measuring tubes opens with an inlet-side, first measuring tube end into a second flow opening of the first flow divider and with an outlet-side, second measuring tube end into a second flow opening of the second flow divider. Each of the flow dividers includes additionally, in each case, a flange with a sealing surface for fluid tight connecting of the measuring transducer to tubular segments of the pipeline serving, respectively, for supplying and removing medium to and from the measuring transducer.

For producing the above discussed reaction forces, the measuring tubes are caused to vibrate during operation, driven by an exciter mechanism serving for producing, or maintaining, as the case may be, mechanical oscillations, especially bending oscillations, of the measuring tubes in the so-called wanted mode. The oscillations in the wanted mode are, most often, especially in the case of application of the measuring transducer as a Coriolis, mass flow meter and/or densimeter, developed, at least partially, as lateral bending oscillations and, in the case of medium flowing through the measuring tubes, as a result of therein induced Coriolis forces, as additional, equal frequency oscillations superimposed in the so-called Coriolis mode. Accordingly, the—here most often electrodynamic—exciter mechanism is embodied in such a manner, that, therewith, the two measuring tubes are excitable in the wanted mode, at least partially, especially also predominantly, to opposite equal bending oscillations differentially—thus through introduction of exciter forces acting simultaneously along a shared line of action, however, in opposed direction.

For registering vibrations, especially bending oscillations, of the measuring tubes excited by means of the exciter mechanism and for producing oscillation signals representing vibrations, the measuring transducers have, additionally, in each case, a, most often, likewise electrodynamic, sensor arrangement reacting to relative movements of the measuring tubes. Typically, the sensor arrangement is formed by means of an inlet-side, oscillation sensor registering oscillations of the measuring tubes differentially—thus only relative movements of the measuring tubes—as well as by means of an outlet-side, oscillation sensor registering oscillations of the measuring tubes differentially. Each of the oscillation sensors, which are usually constructed equally with one another, is formed by means of a permanent magnet held on the first measuring tube and a cylindrical coil held on the second measuring tube and permeated by the magnetic field of the permanent magnet.

In operation, the above described tube arrangement formed by means of the two measuring tubes is excited by means of the electromechanical exciter mechanism, at least at times, to execute mechanical oscillations in the wanted mode at at least one dominating, wanted, oscillation frequency. Selected as oscillation frequency for the oscillations in the wanted mode is, in such case, usually a natural, instantaneous, resonance frequency of the tube arrangement, which, in turn, depends essentially both on size, shape and material of the measuring tubes as well as also on an instantaneous density of the medium; in given cases, this wanted oscillation frequency can also be influenced significantly by an instantaneous viscosity of the medium. As a result of fluctuating density of the medium being measured and/or as a result of media change occurring during operation, the wanted oscillation frequency during operation of the measuring transducer varies naturally, at least within a calibrated and, thus, predetermined, wanted frequency band, which correspondingly has a predetermined lower, and a predetermined upper, limit frequency.

For defining a wanted oscillatory length of the measuring tubes and, associated therewith, for adjusting the band of the wanted frequency, measuring transducers of the above described type include—additionally, most often, at least one inlet-side, coupling element, which is affixed to both measuring tubes and spaced from the two flow dividers, for forming inlet-side, oscillation nodes for opposite equal vibrations, especially bending oscillations, of both measuring tubes, as well as at least one outlet-side, coupling element, which is affixed to both measuring tubes and spaced both from the two flow dividers, as well as also from the inlet-side, coupling element, for forming outlet-side, oscillation nodes for opposite equal vibrations, especially bending oscillations, of the measuring tubes. In the case of curved measuring tubes, in such case, the length of a section of a deflection curve of any of the measuring tubes extending between the inlet side and the outlet-side coupling elements, consequently the length of an imaginary center line of the said measuring tube connecting the areal centers of gravity of all imaginary cross sectional areas of the respective measuring tube, corresponds to the wanted oscillatory length of the measuring tubes. By means of the coupling elements, which thus belong to the tube arrangement, additionally also an oscillation quality factor of the tube arrangement, as well as also the sensitivity of the measuring transducer, in total, can be influenced, in a manner such that, for a minimum required sensitivity of the measuring transducer, at least one minimum, wanted oscillatory length is provided.

Development in the field of measuring transducers of vibration-type has, in the meantime, reached a level, wherein modern measuring transducers of the described type can, for a broad application spectrum of flow measurement technology, satisfy highest requirements as regards precision and reproducibility of the measurement results. Thus, such measuring transducers are, in practice, applied for mass flow rates from some few l/h (gram per hour) up to some t/min (tons per minute), at pressures of up to 100 bar for liquids or even over 300 bar for gases. The accuracy of measurement achieved, in such case, lies usually at about 99.9% of the actual value, or above, or at a measuring error of about 0.1%, wherein a lower limit of the guaranteed measurement range can lie quite easily at about 1% of the measurement range end value. Due to the high bandwidth of their opportunities for use, industrial grade measuring transducers of vibration-type are available with nominal diameters (corresponding to the caliber of the pipeline to be connected to the measuring transducer, or to the caliber of the measuring transducer measured at the connecting flange), which lie in a nominal diameter range between 1 mm and 250 mm and at maximum nominal mass flow rate of 1000 t/h, in each case, for pressure losses of less than 3 bar. A caliber of the measuring tubes lies, in such case, for instance, in a range between 80 mm and 100 mm.

In spite of the fact that, in the meantime, measuring transducers for use in pipelines with very high mass flow rates and, associated therewith, very large calibers of far beyond 100 mm have become available, there is still considerable interest in obtaining measuring transducers of high precision and low pressure loss also for yet larger pipeline calibers, about 300 mm or more, or mass flow rates of 1500 t/h or more, for instance for applications in the petrochemical industry or in the field of transport and transfer of petroleum, natural gas, fuels, etc. This leads, in the case of correspondingly scaled enlarging of the already established measuring transducer designs known from the state of the art, especially from EP-A 1 001 254, EP-A 553 939, U.S. Pat. No. 4,793,191, US-A 2002/0157479, US-A 2007/0151368, U.S. Pat. Nos. 5,370, 002, 5,796,011, 6,308,580, 6,711,958, 7,134,347, 7,350,421, or WO-A 03/027616, to the fact that the geometric dimensions would be exorbitantly large, especially the installed length corresponding to a distance between the sealing surfaces of both flanges and, in the case of curved measuring tubes, a maximum lateral extension of the measuring transducer, especially dimensions for the desired oscillation characteristics, the required load bearing ability, as well as the maximum allowed pressure loss. Along with that, also the empty mass of the measuring transducer increases unavoidably, with conventional measuring transducers of large nominal diameter already having an empty mass of about 400 kg. Investigations, which have been carried out for measuring transducers with two bent measuring tubes, constructed, for instance, according to U.S. Pat. Nos. 7,350,421 or 5,796,011, as regards their to-scale enlargement to still greater nominal diameters, have, for example, shown that, for nominal diameters of more than 300 mm, the empty mass of a to-scale enlarged, conventional measuring transducer would lie far above 500 kg, accompanied by an installed length of more than 3000 mm and a maximum lateral extension of more than 1000 mm. As a result, it can be said that industrial grade, mass producible, measuring transducers of conventional design and materials with nominal diameters far above 300 mm cannot be expected in the foreseeable future both for reasons of technical implementability, as well as also due to economic considerations.

Proceeding from the above recounted state of the art, it is consequently an object of the invention to provide a measuring transducer of high sensitivity and high oscillation quality factor, which also in the case of large mass flow rates of more than 1000 t/h, causes only a small pressure loss of, as much as possible, less than 3 bar and which also has a construction, which is as compact as possible at large nominal diameters of over 100 mm and, not last, is also suitable for applications involving extremely hot, or extremely cold, media and/or significant fluctuating media temperatures.

For achieving the object, the invention resides in a measuring transducer of vibration-type for registering at least one physical, measured variable of a flowable medium guided in a pipeline, for example, a gas, a liquid, a powder or other flowable material, and/or for producing Coriolis forces serving for registering a mass flow rate of a flowable medium guided in a pipeline, especially a gas, a liquid, a powder or other flowable material. The measuring transducer comprises, according to the invention, a, for example, at least partially essentially tubular and/or at least partially externally circularly cylindrical, transducer housing, of which an inlet-side, first housing end is formed by means of an inlet-side, first flow divider having exactly four, for example, circularly cylindrical, tapered or conical, flow openings spaced, in each case, from one another, and an outlet-side, second housing end is formed by means of an outlet-side, second flow divider having exactly four, for example, circularly cylindrical, tapered or conical, flow openings spaced, in each case, from one another. Furthermore, the measuring transducer comprises a tube arrangement with exactly four, curved or bent (for example, at least sectionally V-shaped and/or at least sectionally circular arc shaped), measuring tubes forming flow paths arranged for parallel flow and connected to the, for example, equally constructed, flow dividers for guiding flowing medium, especially measuring tubes held oscillatably in the transducer housing only by means of said flow dividers and/or equally constructed and/or pairwise parallel relative to one another. Of the four measuring tubes, for example, measuring tubes constructed equally both as regards geometry as well as also as regards material, a first measuring tube, especially a circularly cylindrical, first measuring tube, opens with an inlet-side, first measuring tube end into a first flow opening of the first flow divider and with an outlet-side, second measuring tube end into a first flow opening of the second flow divider, a second measuring tube, which is at least sectionally parallel to the first measuring tube, opens with an inlet-side, first measuring tube end into a second flow opening of the first flow divider and with an outlet-side, second measuring tube end into a second flow opening of the second flow divider, a third measuring tube opens with an inlet-side, first measuring tube end into a third flow opening of the first flow divider and with an outlet-side, second measuring tube end into a third flow opening of the second flow divider, as well as a fourth measuring tube, which is at least sectionally parallel to the third measuring tube, opens with an inlet-side, first measuring tube end into a fourth flow opening of the first flow divider and with an outlet-side, second measuring tube end into a fourth flow opening of the second flow divider. Additionally, the measuring transducer comprises an electromechanical exciter mechanism, for example, one formed by means of one or more electrodynamic oscillation exciters, for producing and/or maintaining mechanical oscillations, especially bending oscillations, of the four measuring tubes. In the case of the measuring transducer of the invention, the measuring tubes are so embodied and arranged in the measuring transducer, that the tube arrangement has lying between the first imaginary longitudinal section plane and the second imaginary longitudinal section plane of the measuring transducer, and parallel to the first imaginary longitudinal section plane of the measuring transducer and to the second imaginary longitudinal section plane of the measuring transducer, a first imaginary longitudinal section plane, with respect to which the tube arrangement is mirror symmetric, and the tube arrangement has perpendicular to its imaginary first longitudinal section plane a second imaginary longitudinal section plane, with respect to which the tube arrangement is likewise mirror symmetric.

Moreover, the invention resides in a measuring system for measuring density and/or mass flow rate, for example, thus a total mass flow totalled over a time interval, of a medium flowing, at least at times, in a pipeline, for example, with a mass flow rate of more than 1000 t/h, for instance, a medium such as a gaseous, a liquid, a powder or other flowable material. The measuring system, for example, one embodied as an in-line measuring device and/or a measuring device in compact construction, comprises said measuring transducer, as well as, electrically coupled with the measuring transducer, for example, arranged in an electronics housing mechanically connected with the transducer housing, a transmitter-electronics for activating the measuring transducer, especially its exciter mechanism, and for evaluating oscillation signals delivered by the measuring transducer. Especially, the invention resides thus in the use of said measuring system for measuring a density and/or a mass flow rate, especially a total mass flow totalled over a time interval, and/or a viscosity and/or a Reynolds number of a medium flowing in a process line, for instance, a pipeline, at least at times, with a mass flow rate of more than 1000 t/h, for example, more than 1500 t/h, for instance, a medium such as e.g. a gaseous, a liquid, a powder or other flowable material.

According to a first embodiment of the measuring transducer of the invention, the exciter mechanism is embodied in such a manner that, therewith, each of the four measuring tubes is excitable, for example, even simultaneously, to bending oscillations.

According to a second embodiment of the measuring transducer of the invention, the exciter mechanism is embodied in such a manner that the first measuring tube and the second measuring tube are excitable to bending oscillations, which are opposite equal relative to the second imaginary longitudinal section planar, for example, thus symmetric relative to the second imaginary longitudinal section plane, and the third measuring tube and the fourth measuring tube to bending oscillations, which are opposite equal relative to the second imaginary longitudinal section plane, for example, thus symmetric relative to the second imaginary longitudinal section plane.

According to a third embodiment of the measuring transducer of the invention, the exciter mechanism is embodied in such a manner that the first measuring tube and the third measuring tube are excitable to bending oscillations, which are opposite equal relative to the second imaginary longitudinal section plane, for example, thus symmetric relative to the second imaginary longitudinal section plane, and the second measuring tube and the fourth measuring tube to bending oscillations, which are opposite equal relative to the second imaginary longitudinal section plane, for example, thus symmetric relative to the second imaginary longitudinal section plane.

According to a fourth embodiment of the measuring transducer of the invention, the exciter mechanism is embodied in such a manner that a natural bending oscillation mode of first type inherent to the tube arrangement is excitable, in which bending oscillation mode of first type the first measuring tube and the second measuring tube execute, relative to the second imaginary longitudinal section plane, opposite equal, for example, thus relative to the second imaginary longitudinal section plane, symmetric, bending oscillations about, in each case, a static rest position associated with the respective measuring tube, for instance, cantilever, bending oscillations about, in each case, an imaginary oscillation axis parallel to at least two of the imaginary connecting axes, and in which bending oscillation mode of first type the third measuring tube and the fourth measuring tube execute, relative to the second imaginary longitudinal section plane, opposite equal, for example, thus, relative to the second imaginary longitudinal section plane, symmetric, bending oscillations about, in each case, a static rest position associated with the respective measuring tube, for instance, cantilever, bending oscillations about, in each case, an imaginary oscillation axis parallel to at least two of the imaginary connecting axes, in such a manner, that, relative to the second imaginary longitudinal section plane, said bending oscillations of the first measuring tube are thus opposite equal to said bending oscillations of the third measuring tube, and that, relative to the second imaginary longitudinal section plane, said bending oscillations of the second measuring tube are thus opposite equal to said bending oscillations of the fourth measuring tube.

Developing this embodiment of the invention further, the exciter mechanism is embodied in such a manner that a natural bending oscillation mode of second type inherent to the tube arrangement is excitable, for example, thus simultaneously with the bending oscillation mode of first type, in which bending oscillation mode of second type the first measuring tube and the second measuring tube execute, relative to the second imaginary longitudinal section plane, opposite equal, for example, thus relative to the second imaginary longitudinal section plane, symmetric, bending oscillations about, in each case, a static rest position associated with the respective measuring tube, for instance, cantilever, bending oscillations about, in each case, an imaginary oscillation axis parallel to at least two of the imaginary connecting axes, and in which bending oscillation mode of second type the third measuring tube and the fourth measuring tube execute, relative to the second imaginary longitudinal section plane, opposite equal, for example, thus relative to the second imaginary longitudinal section plane, symmetric, bending oscillations about, in each case, a static rest position associated with the respective measuring tube, for instance, cantilever, bending oscillations about, in each case, an imaginary oscillation axis parallel to at least two of the imaginary connecting axes, in such a manner, that, relative to the second imaginary longitudinal section plane, said bending oscillations of the first measuring tube are thus opposite equal to said bending oscillations of the fourth measuring tube, and that, relative to the second imaginary longitudinal section plane, said bending oscillations of the second measuring tube are thus opposite equal to said bending oscillations of the third measuring tube.

Alternatively, or in supplementation, it is additionally provided that an eigenfrequency of the bending oscillation mode of first type, for example, such an eigenfrequency measurable in the case of a tube arrangement completely filled with water, is different, for example, by more than 10 Hz, from an eigenfrequency of the bending oscillation mode of second type, for example, such an eigenfrequency in the case of a tube arrangement completely filled with water and/or measurable at the same time as the eigenfrequency of the bending oscillation mode of first type; e.g. in such a manner, that said eigenfrequency of the bending oscillation mode of first type is greater by more than 10 Hz than said eigenfrequency of the bending oscillation mode of second type or that said eigenfrequency of the bending oscillation mode of first type is smaller by more than 10 Hz than said eigenfrequency of the bending oscillation mode of second type.

According to a fifth embodiment of the invention, each of the four measuring tubes has a measuring tube peak, defined as the greatest perpendicular distance of the respective measuring tube from the first imaginary longitudinal section plane.

According to a sixth embodiment of the measuring transducer the invention lies a center of mass the tube arrangement in a both to the first imaginary longitudinal section plane as well as also to the second imaginary longitudinal section plane, in each case, perpendicular imaginary cross sectional planar the tube arrangement.

According to a seventh embodiment of the measuring transducer of the invention, the tube arrangement is mirror symmetric relative to an imaginary cross sectional plane the tube arrangement perpendicular both to the first imaginary longitudinal section plane as well as also to the second imaginary longitudinal section plane.

According to an eighth embodiment of the measuring transducer of the invention, each of the four measuring tubes has a measuring tube peak, defined as the greatest perpendicular distance of the respective measuring tube from the first imaginary longitudinal section plane, and an imaginary cross sectional plane of the tube arrangement perpendicular to both the first imaginary longitudinal section plane as well as also the second imaginary longitudinal section plane intersects each of the four measuring tubes in its respective measuring tube peak.

According to a ninth embodiment of the measuring transducer of the invention, a middle segment of the transducer housing at least partially is formed by means of a straight, for example, circularly cylindrical, support tube, for instance, in such a manner, that a segment of the first measuring tube extending outwards from said support tube on a first side and a segment of the second measuring tube extending outwards from said support tube on the first side are surrounded by a first housing cap of the transducer housing, and that a segment of the third measuring tube extending outwards from said support tube on a second side lying opposite to the first side and a segment of the fourth measuring tube extending outwards from said support tube on the second side are surrounded by a second housing cap of the transducer housing, for example, a second housing cap constructed equally to the first housing cap.

According to a tenth embodiment of the measuring transducer of the invention, it is additionally provided, that the two flow dividers are additionally so embodied and arranged in the measuring transducer, that an imaginary first connecting axis of the measuring transducer imaginarily connecting the first flow opening of the first flow divider with the first flow opening of the second flow divider extends parallel to an imaginary second connecting axis of the measuring transducer imaginarily connecting the second flow opening of the first flow divider with the second flow opening of the second flow divider, that an imaginary third connecting axis of the measuring transducer imaginarily connecting the third flow opening of the first flow divider with the third flow opening of the second flow divider extends parallel to an imaginary fourth connecting axis of the measuring transducer imaginarily connecting the fourth flow opening of the first flow divider with the fourth flow opening of the second flow divider. Developing this embodiment of the invention further, it is additionally provided, that a first imaginary longitudinal section plane of the measuring transducer, within which the first imaginary connecting axis and the second imaginary connecting axis extend, for example, parallel to a principal flow axis of the measuring transducer aligning with the pipeline is parallel to a second imaginary longitudinal section plane of the measuring transducer, within which the imaginary third connecting axis and the imaginary fourth connecting axis extend, for example, in such a manner, that the first imaginary longitudinal section plane of the tube arrangement lies between the first and second imaginary longitudinal section planes of the measuring transducer and/or is parallel to the first and second imaginary longitudinal section planes of the measuring transducer.

According to an eleventh embodiment of the measuring transducer of the invention, it is additionally provided, that the two flow dividers are so embodied and arranged in the measuring transducer, that a third imaginary longitudinal section plane of the measuring transducer, within which the imaginary first connecting axis and the imaginary third connecting axis extend, is parallel to a fourth imaginary longitudinal section plane of the measuring transducer, within which the imaginary second connecting axis and the imaginary fourth connecting axis extend. Developing this embodiment of the invention further, it is additionally provided, that the second imaginary longitudinal section plane of the tube arrangement extends between the third imaginary longitudinal section plane of the measuring transducer and the fourth imaginary longitudinal section plane of the measuring transducer, for example, in such a manner, that the second imaginary longitudinal section plane of the tube arrangement is parallel to the third imaginary longitudinal section plane of the measuring transducer and parallel to the fourth imaginary longitudinal section plane of the measuring transducer.

According to a twelfth embodiment of the measuring transducer of the invention, it is additionally provided, that the four flow openings of the first flow divider are so arranged, that imaginary areal centers of gravity associated with cross sectional areas, especially circularly shaped, cross sectional areas, of the flow openings of the first flow divider form the vertices of an imaginary rectangle or of an imaginary square, wherein said cross sectional areas lie in a shared imaginary cross sectional cutting plane of the first flow divider, for example, perpendicular to the first imaginary longitudinal section plane of the measuring transducer, or to the second imaginary longitudinal section plane of the measuring transducer.

According to a thirteenth embodiment of the measuring transducer of the invention, it is additionally provided, that the four flow openings of the second flow divider so are arranged, that imaginary areal centers of gravity associated with cross sectional areas of the flow openings of the second flow divider form the vertices of an imaginary rectangle or of an imaginary square, wherein said cross sectional areas lie in a shared imaginary cross sectional cutting plane of the second flow divider, for example, perpendicular to the first imaginary longitudinal section plane of the measuring transducer, or to the second imaginary longitudinal section plane of the measuring transducer.

According to a fourteenth embodiment of the measuring transducer of the invention, it is additionally provided, that each of the four measuring tubes, especially equally large measuring tubes, has a caliber, which amounts to more than 40 mm, especially more than 60 mm. Developing this embodiment of the invention further, it is additionally provided, that the measuring tubes are so bent and so arranged, that a caliber to height ratio of the tube arrangement, defined by a ratio of the caliber of the first measuring tube to a maximal lateral expanse of the tube arrangement, measured from a peak of the first measuring tube to a peak of the third measuring tube, amounts to more than 0.05, especially more than 0.07 and/or less than 0.35, especially less than 0.2.

According to a fifteenth embodiment of the measuring transducer of the invention, it is additionally provided, that the first flow divider has a flange, especially a flange having mass of more than 50 kg, for connecting the measuring transducer to a tubular segment of the pipeline serving for supplying medium to the measuring transducer and the second flow divider has a flange, especially a flange having a mass of more than 50 kg, for connecting the measuring transducer to a segment of the pipeline serving for removing medium from the measuring transducer. Developing this embodiment of the invention further, each of the flanges has a sealing surface for fluid tight connecting of the measuring transducer with the, in each case, corresponding tubular segment of the pipeline, wherein a distance between the sealing surfaces of both flanges defines an installed length of the measuring transducer, especially an installed length amounting to more than 1000 mm and/or less than 3000 mm. Especially, the measuring transducer is additionally so embodied, that, in such case, a measuring tube length of the first measuring tube corresponding to a length of a section of the deflection curve of the first measuring tube extending between the first flow opening of the first flow divider and the first flow opening of the second flow divider is so selected, that a measuring tube length to installed length ratio of the measuring transducer, as defined by a ratio of the measuring tube length of the first measuring tube to the installed length of the measuring transducer, amounts to more than 0.7, especially more than 0.8 and/or less than 1.2, and/or that a caliber to installed length ratio of the measuring transducer, as defined by a ratio of a caliber of the first measuring tube to the installed length of the measuring transducer, amounts to more than 0.02, especially more than 0.05 and/or less than 0.09. Alternatively thereto or in supplementation thereof, the measuring transducer is so embodied, that a nominal diameter to installed length ratio of the measuring transducer, as defined by a ratio of the nominal diameter of the measuring transducer to the installed length of the measuring transducer, is smaller than 0.3, especially smaller than 0.2 and/or greater than 0.1, wherein the nominal diameter corresponds to a caliber of the pipeline, in whose course the measuring transducer is to be used.

In a sixteenth embodiment of the measuring transducer of the invention, it is additionally provided, that a measuring tube length of the first measuring tube corresponding to a length of a section of the deflection curve of the first measuring tube extending between the first flow opening of the first flow divider and the first flow opening of the second flow divider amounts to more than 1000 mm, especially more than 1200 mm and/or less than 3000 mm, especially less than 2500.

In a seventeenth embodiment of the measuring transducer of the invention, it is additionally provided, that each of the four measuring tubes, for example, four measuring tubes of equal caliber, is so arranged, that a smallest lateral separation of each of the four measuring tubes, for example, measuring tubes of equal length, from a housing side wall of the transducer housing is, in each case, greater than zero, for example, also greater than 3 mm and/or greater than twice a respective tube wall thickness; and/or that a smallest lateral separation between two neighboring measuring tubes amounts to, in each case, greater than 3 mm and/or greater than the sum of their respective tube wall thicknesses.

In an eighteenth embodiment of the measuring transducer of the invention, it is additionally provided, that each of the flow openings is so arranged, that a smallest lateral separation of each of the flow openings from a housing side wall of the transducer housing amounts, in each case, to greater than zero, for example, also greater than 3 mm and/or greater than twice a smallest tube wall thickness of the measuring tubes; and/or that a smallest lateral separation between the flow openings amounts to greater than 3 mm and/or greater than twice a smallest tube wall thickness of the measuring tubes.

According to a nineteenth embodiment of the measuring transducer of the invention, it is additionally provided, that the exciter mechanism is embodied in such a manner, that the first measuring tube and the second measuring tube are excitable during operation to opposite equal bending oscillations and the third measuring tube and the fourth measuring tube are excitable during operation to opposite equal bending oscillations.

In a twentieth embodiment of the measuring transducer of the invention, it is additionally provided, that a mass ratio of an empty mass of the total measuring transducer to an empty mass of the first measuring tube is greater than 10, especially greater than 15 and smaller than 25.

In a twenty-first embodiment of the measuring transducer of the invention, it is additionally provided, that an empty mass, $M_{18}$, of the first measuring tube, especially each of the measuring tubes, is greater than 20 kg, especially greater than 30 kg and/or smaller than 50 kg.

According to a twenty-second embodiment of the measuring transducer of the invention, it is additionally provided, that an empty mass of the measuring transducer is greater than 200 kg, especially greater than 300 kg.

In a twenty-third embodiment of the measuring transducer of the invention, it is additionally provided, that a nominal diameter of the measuring transducer, which corresponds to a caliber of the pipeline, in whose course the measuring transducer is to be used, amounts to more than 100 mm, especially greater than 300 mm. In advantageous manner, the measuring transducer is additionally so embodied, that a mass to nominal diameter ratio of the measuring transducer, as defined by a ratio of the empty mass of the measuring transducer to the nominal diameter of the measuring transducer, is smaller than 2 kg/mm, especially smaller than 1 kg/mm and/or greater than 0.5 kg/mm.

In a twenty-fourth embodiment of the measuring transducer of the invention, it is additionally provided, that the first and the second measuring tubes are of equal construction, at least as regards a material, of which their tube walls are, in each case, composed, and/or as regards their geometrical tube dimensions, especially a tube length, a tube wall thickness, a tube outer diameter and/or a caliber.

According to a twenty-fifth embodiment of the invention, it is additionally provided, that the third and fourth measuring tubes are of equal construction, at least as regards a material, of which their tube walls are, in each case, composed, and/or as regards their geometric tube dimensions, especially a tube length, a tube wall thickness, a tube outer diameter and/or a caliber.

According to a twenty-sixth embodiment of the measuring transducer of the invention, it is additionally provided, that all four measuring tubes are of equal construction, as regards a material, of which their tube walls are composed, and/or as regards their geometric tube dimensions, especially a tube length, a tube wall thickness, a tube outer diameter and/or a caliber.

In a twenty-seventh embodiment of the measuring transducer of the invention, it is additionally provided, that a material, of which the tube walls of the four measuring tubes are at least partially composed, is titanium and/or zirconium and/or, for example, stainless and/or high strength steel, duplex steel and/or super duplex steel, or Hastelloy.

In a twenty-eighth embodiment of the measuring transducer of the invention, it is additionally provided, that the transducer housing, the flow dividers and tube walls of the measuring tubes are, in each case, composed of steel, for example, stainless steel.

In a twenty-ninth embodiment of the measuring transducer of the invention, it is additionally provided, that the exciter mechanism is formed by means of a first oscillation exciter, especially an electrodynamic, first oscillation exciter and/or a first oscillation exciter differentially exciting oscillations of the first measuring tube relative to the second measuring tube. Especially, the exciter mechanism is formed by means of a second oscillation exciter, for example, an electrodynamic second oscillation exciter and/or a second oscillation exciter differentially exciting oscillations of the third measuring tube relative to the fourth measuring tube. In such case, it is additionally provided, that the first and second oscillation exciters are interconnected electrically in series, in such a manner, that a combined driver signal excites combined oscillations of the first and third measuring tubes relative to the second and fourth measuring tube. The oscillation exciter of the exciter mechanism can be formed, for example, by means of a permanent magnet held on the first measuring tube and a cylindrical coil permeated by the magnetic field of the permanent magnet and held on the second measuring tube, and wherein the second oscillation exciter is formed by means of a permanent magnet held on the third measuring tube and a cylindrical coil permeated by the magnetic field of the permanent magnet and held on the fourth measuring tube.

According to a first further development of the measuring transducer of the invention, such further comprises: A first coupling element of first type, which is spaced both from the first flow dividers as well as also from the second flow dividers, affixed on the inlet side to each of the four measuring tubes and having, for example, an H- or X-shaped basic shape, for tuning eigenfrequencies of natural oscillation modes of the tube arrangement, for example, bending oscillation modes, as well as a second coupling element of first type, which is spaced both from the first flow dividers as well as also from the second flow dividers, affixed on the outlet side to each of the four measuring tubes, having, for example, an H- or X-shaped basic shape and/or essentially equally constructed to the first coupling element of first type, for tuning eigenfrequencies of natural oscillation modes of the tube arrangement, for example, bending oscillation modes.

According to a first embodiment of the first further development of the measuring transducer of the invention, it is additionally provided that each of the two coupling elements of first type is symmetric relative to the first imaginary longitudinal section plane of the tube arrangement.

According to a second embodiment of the first further development of the measuring transducer of the invention, it is additionally provided that each of the two coupling elements of first type is symmetric relative to the second imaginary longitudinal section plane of the tube arrangement.

According to a third embodiment of the first further development of the measuring transducer of the invention, it is additionally provided that both coupling elements of first type are arranged in the measuring transducer symmetrically relative to an imaginary cross sectional plane of the tube arrangement perpendicular both to the first imaginary longitudinal section plane as well as also to the second imaginary longitudinal section plane of the tube arrangement.

According to a fourth embodiment of the first further development of the measuring transducer of the invention, it is additionally provided that the two coupling elements of first type are arranged in the measuring transducer equidistantly relative to an imaginary cross sectional plane of the tube arrangement perpendicular both to the first imaginary longitudinal section plane as well as also to the second imaginary longitudinal section plane of the tube arrangement.

According to a fifth embodiment of the first further development of the measuring transducer of the invention, it is additionally provided that the two coupling elements of first type are arranged extending parallel in the measuring transducer relative to an imaginary cross sectional plane of the tube arrangement perpendicular both to the first imaginary longitudinal section plane as well as also to the second imaginary longitudinal section plane of the tube arrangement.

According to a sixth embodiment of the first further development of the measuring transducer of the invention, it is additionally provided that each of the two coupling elements of first type is so embodied and placed in the measuring transducer that it is symmetric relative to the first imaginary longitudinal section plane of the tube arrangement and/or relative to the second imaginary longitudinal section plane of the tube arrangement.

According to a seventh embodiment of the first further development of the measuring transducer of the invention, it is additionally provided that each of the two coupling elements of first type is so embodied and placed in the measuring transducer that it is embodied X-shaped as projected onto an imaginary cross sectional plane of the tube arrangement perpendicular both to the first imaginary longitudinal section plane of the tube arrangement as well as also to the second imaginary longitudinal section plane of the tube arrangement, or that it is embodied H-shaped as projected onto an imaginary cross sectional plane of the tube arrangement perpendicular to the first imaginary longitudinal section plane and the second imaginary longitudinal section plane of the tube arrangement.

According to an eighth embodiment of the first further development of the measuring transducer of the invention, it is additionally provided that both the first coupling element of first type as well as also the second coupling element of first type are formed by means of plate shaped elements.

According to a ninth embodiment of the first further development of the measuring transducer of the invention, it is additionally provided that each of the two coupling elements of first type is at least sectionally bulged, for example, in such a manner, that it is at least sectionally convex relative to an imaginary cross sectional plane of the tube arrangement extending between the first coupling element of first type and the second coupling element of first type and perpendicular both to the first imaginary longitudinal section plane of the tube arrangement as well as also to the second imaginary longitudinal section plane of the tube arrangement.

According to a tenth embodiment of the first further development of the measuring transducer of the invention, it is additionally provided that both the first coupling element of first type as well as also the second coupling element of first type are at least sectionally convex relative to, namely as seen from, an imaginary cross sectional plane of the tube arrangement extending between the first coupling element of first type and the second coupling element of first type and perpendicular both to the first imaginary longitudinal section plane of the tube arrangement as well as also to the second imaginary longitudinal section plane of the tube arrangement.

According to an eleventh embodiment of the first further development of the measuring transducer of the invention, such further comprises: A, for example, plate shaped, first coupling element of second type, which, for forming inlet-side oscillation nodes both for vibrations, for example bending oscillations, of the first measuring tube as well as also for thereto opposite equal vibrations, for example bending oscillations, of the second measuring tube is affixed on the inlet side to the first measuring tube and to the second measuring tube, for example, both to a tube segment of the first measuring tube extending between the first flow dividers and the first coupling element of first type as well as also to a tube segment of the second measuring tube extending between the first flow dividers and the first coupling element of first type; a, for example, plate shaped and/or equally constructed to the first coupling element of second type and/or parallel to the first coupling element of second type, second coupling element of second type, which for forming outlet-side oscillation nodes both for vibrations, for example bending oscillations, of the first measuring tube as well as also for thereto opposite equal vibrations, for example bending oscillations, of the second measuring tube, is affixed on the outlet side to the first measuring tube and to the second measuring tube, for example, both to a tube segment of the first measuring tube extending between the second flow dividers and the second coupling element of first type as well as also to a tube segment of the second measuring tube extending between the second flow dividers and the second coupling element of first type; a, for example, plate shaped and/or equally constructed to the first coupling element of second type and/or parallel to the second coupling element of second type, third coupling element of second type, which, for forming inlet-side oscillation nodes both for vibrations, for example bending oscillations, of the third measuring tube as well as also thereto opposite equal vibrations, for example bending oscillations, of the fourth measuring tube, is affixed, spaced both from the first flow dividers as well as also from the second flow dividers on the inlet side, to the third measuring tube and to the fourth measuring tube, for example, both to a tube segment of the third measuring tube extending between the first flow dividers and the first coupling element of first type as well as also to a tube segment of the fourth measuring tube extending between the first flow dividers and the first coupling element of first type; as well as a, for example, plate shaped and/or equally constructed to the first coupling element of second type and/or parallel to the first coupling element of second type, fourth coupling element of second type, which, for the forming outlet-side oscillation nodes both for vibrations, for example bending oscillations, of the third measuring tube as well as also for thereto opposite equal vibrations, for example bending oscillations, of the fourth measuring tube is affixed on the outlet side, spaced both from the first flow dividers as well as also from the second flow dividers, as well as also from the first coupling element, to the third measuring tube and to the fourth measuring tube, for example, both to a tube segment of the third measuring tube extending between the second flow dividers and the second coupling element of first type as well as also to a tube segment of the fourth measuring tube extending between the second flow dividers and the second coupling element of first type. The measuring transducer according to this embodiment of the invention can be manufactured, for example, by first affixing both the first coupling element of second type as well as also the second coupling element of second type, in each case, to the first measuring tube and to the second measuring tube for the manufacture of a first measuring tube package as well as both the third coupling element of second type as well as also the fourth coupling element of second type, in each case, to the third measuring tube and to the fourth measuring tube for the manufacture of a second measuring tube package; and that thereafter first affixing both the first coupling element of first type as well as also the second coupling element of first type, in each case, to at least one, for example, also each, of the measuring tubes of the first measuring tube package and to at least one, for example, also each, of the measuring tubes of the second measuring tube package.

In a second further development of the invention, the measuring transducer additionally comprises a sensor arrangement for producing oscillation signals representing vibrations, especially bending oscillations, of the measuring tubes, by reacting to vibrations of the measuring tubes, especially bending oscillations excited by means of the exciter mechanism. The sensor arrangement is, for example, an electrodynamic sensor arrangement and/or is formed by means of oscillation sensors constructed equally to one another.

In a first embodiment of the second further development of the invention, it is provided, that the sensor arrangement is formed by means of an inlet-side, first oscillation sensor, especially an electrodynamic, first oscillation sensor and/or a first oscillation sensor differentially registering oscillations of the first measuring tube relative to the second measuring tube, as well as by means of an outlet-side, second oscillation sensor, especially an electrodynamic, second oscillation sensor and/or a second oscillation sensor differentially registering oscillations of the first measuring tube relative to the second measuring tube, especially in such a manner that a measuring length of the measuring transducer corresponding to a length of a section of a deflection curve of the first measuring tube extending between the first oscillation sensor and the second oscillation sensor amounts to more than 500 mm, especially more than 600 mm and/or less than 1200 mm, and/or in such a manner that a caliber to measuring length ratio of the measuring transducer, as defined by a ratio of a caliber of the first measuring tube to the measuring length of the measuring transducer, amounts to more than 0.05, especially more than 0.09. Additionally, the first oscillation sensor can be formed by means of a permanent magnet held on the first measuring tube and a cylindrical coil permeated by the magnetic field of the permanent magnet and held on the second measuring tube, and the second oscillation sensor by means of a permanent magnet held on the first measuring tube and a cylindrical coil permeated by the magnetic field of the permanent magnet and held on the second measuring tube.

In a second embodiment of the second further development of the invention, it is additionally provided, that the sensor arrangement is formed by means of an inlet-side, first oscillation sensor, especially an electrodynamic, first oscillation sensor and/or a first oscillation sensor differentially registering oscillations of the first measuring tube relative to the second measuring tube, by an outlet-side, second oscillation sensor, especially an electrodynamic, second oscillation sensor and/or a second oscillation sensor differentially registering oscillations of the first measuring tube relative to the second measuring tube, by an inlet-side, third oscillation sensor, especially an electrodynamic, third oscillation sensor and/or a third oscillation sensor differentially registering oscillations of the third measuring tube relative to the fourth measuring tube, as well as by an outlet-side, fourth oscillation sensor, especially an electrodynamic, fourth oscillation sensor and/or a fourth oscillation sensor differentially registering oscillations of the third measuring tube relative to the fourth measuring tube, especially in such a manner, that a measuring length of the measuring transducer corresponding to a section of a deflection curve of the first measuring tube extending between the first oscillation sensor and the second oscillation sensor amounts to more than 500 mm, especially more than 600 mm and/or less than 1200 mm, and/or in such a manner that a caliber to measuring length ratio of the measuring transducer, as defined by a ratio of a caliber of the first measuring tube to the measuring length of the measuring transducer, amounts to more than 0.05, especially more than 0.09. In such case, in advantageous manner, the first and third oscillation sensors can be interconnected electrically in series in such a manner, that a combined oscillation signal represents combined inlet-side oscillations of the first and third measuring tubes relative to the second and fourth measuring tube, and/or the second and fourth oscillation sensors can be interconnected electrically in series in such a manner, that a combined oscillation signal represents combined outlet-side oscillations of the first and third measuring tubes relative to the second and fourth measuring tube. Alternatively or in supplementation, the first oscillation sensor can further be formed by means of a permanent magnet held on the first measuring tube and a cylindrical coil permeated by the magnetic field of the permanent magnet and held on the second measuring tube, and the second oscillation sensor by means of a permanent magnet held on the first measuring tube and a cylindrical coil permeated by the magnetic field of the permanent magnet and held on the second measuring tube, and/or the third oscillation sensor by means of a permanent magnet held on the third measuring tube and a cylindrical coil permeated by the magnetic field of the permanent magnet and held on the fourth measuring tube and the fourth oscillation sensor by means of a permanent magnet held on the third measuring tube and a cylindrical coil permeated by the magnetic field of the permanent magnet and held on the fourth measuring tube.

According to a first embodiment of the measuring system of the invention, it is additionally provided that the four measuring tubes during operation simultaneously execute bending oscillations, excited by the exciter mechanism, for example, in a bending oscillation fundamental mode of first type. Developing this embodiment of the invention further, it is additionally provided, that the exciter mechanism effects oscillations of the measuring tubes, especially bending oscillations in the first bending oscillation mode of first type by providing that an exciter force generated by means of the first oscillation exciter and acting on the first measuring tube is opposite, for example, also opposite equal, to an exciter force generated at the same time by means of the first oscillation exciter and acting on the second measuring tube.

According to a second embodiment of the measuring system of the invention, it is additionally provided that the exciter mechanism includes at least a first oscillation exciter, for example, one acting differentially on the first and second measuring tubes, for example, thereto affixed and/or an electro-dynamic, first oscillation exciter, for converting electrical excitation power fed by means of the transmitter electronics into the exciter mechanism into mechanical exciter forces, for example, exciter forces having at least one signal frequency corresponding to an eigenfrequency of a natural mode of oscillation of the tube arrangement effecting variable and/or periodic, bending oscillations of the first measuring tube and bending oscillations of the second measuring tube opposite equal to said bending oscillations of the first measuring tube relative to the second imaginary longitudinal section plane of the tube arrangement. Developing this embodiment of the invention further, it is additionally provided that the first oscillation exciter is formed by means of a permanent magnet held on the first measuring tube, for example, in the region of a measuring tube peak, and a cylindrical coil permeated by the magnetic field of the permanent magnet and held on the second measuring tube, for example, in the region of a measuring tube peak. Alternatively, or in supplementation, the exciter mechanism can also further comprise a second oscillation exciter, for example, one acting differentially on the third and fourth measuring tubes, for example, one affixed thereto and/or an electro-dynamic one and/or one constructed equally to the first oscillation exciter and/or electrically serially connected with the first oscillation exciter, for converting electrical excitation power fed by means of the transmitter electronics into the exciter mechanism into mechanical exciter forces, for example, exciter forces having at least one signal frequency corresponding to an eigenfrequency of a natural mode of oscillation of the tube arrangement effecting variable and/or periodic, bending oscillations of the third measuring tube and bending oscillations of the fourth measuring tube opposite equal to said bending oscillations of the third measuring tube relative to the second imaginary longitudinal section plane of the tube arrangement. The second oscillation exciter can, in such case, be formed by means of a permanent magnet held on the third measuring tube, for example, in the region of a measuring tube peak, and a cylindrical coil permeated by the magnetic field of the permanent magnet and held on the fourth measuring tube, for example, in the region of a measuring tube peak.

According to a third embodiment of the measuring system of the invention, it is additionally provided that the transmitter electronics feeds electrical excitation power into the exciter mechanism by means of at least one electrical driver signal supplied to the exciter mechanism, for example, a driver signal having a variable maximum voltage level and/or a variable maximum electrical current level, for example, a variable and/or at least at times periodic, driver signal having at least one signal frequency corresponding to an eigenfrequency of a natural mode of oscillation of the tube arrangement; and that the exciter mechanism converts the electrical excitation power, especially power dependent on a voltage level and on an electrical current level of the at least one driver signal, at least partially both into bending oscillations of the first measuring tube and bending oscillations of the second measuring tube opposite equal to bending oscillations of the first measuring tube relative to the second imaginary longitudinal section plane of the tube arrangement as well as also into bending oscillations of the third measuring tube and bending oscillations of the fourth measuring tube opposite equal to bending oscillations of the third measuring tube relative to the second imaginary longitudinal section plane of the tube arrangement. Developing this embodiment of the invention further, it is additionally provided that the at least one driver signal is fed to the first oscillation exciter, for instance, in such a manner, that a first exciter current driven by a variable first exciter voltage provided by means of the first driver signal flows through its cylindrical coil. Alternatively, or in supplementation, the at least one driver signal can have a plurality of signal components with signal frequencies different from one another, wherein at least one of the signal components of the first driver signal, for instance, a signal component dominating as regards signal power, has a signal frequency corresponding to an eigenfrequency of a natural mode of oscillation of the tube arrangement, for example, an eigenfrequency of the bending oscillation mode of first type, in which each of the four measuring tubes executes bending oscillations.

According to a fourth embodiment of the measuring system of the invention, it is additionally provided that the transmitter electronics, based on electrical excitation power converted in the exciter mechanism, generates a viscosity measured value representing viscosity of the flowing medium; and/or that the transmitter electronics, based on oscillation signals delivered by the measuring transducer, generates a mass flow measured value representing the mass flow rate of the flowing medium and/or a density measured value representing density of the flowing medium.

A basic idea of the invention is to use, instead of the tube arrangements with two measuring tubes, through which the medium flows in parallel, as usually used in the case of conventional measuring transducers of large nominal diameter, tube arrangements with four bent, for example V-shaped or circular arc shaped, measuring tubes, through which the medium flows in parallel, and so, on the one hand, to enable an optimal exploitation of the limited offering of space, while, on the other hand, being able to assure an acceptable pressure loss over a broad measuring range, especially also in the case of very high, mass flow rates of far over 1000 t/h. Moreover, the effective flow cross section of the tube arrangement resulting from the total cross section of the four measuring tubes can, in comparison to conventional measuring transducers of equal nominal diameter and equal empty mass having only two measuring tubes, be directly increased by more than 20%.

An advantage of the invention is additionally, among other things, that, through the application of curved measuring tubes, lasting mechanical stresses, for example, as a result of thermally related expansion of the measuring tubes or as a result of clamping forces introduced into the measuring transducer because of the tube arrangement, are largely prevented within the tube arrangement or at least kept very low and, as a result, the accuracy of measurement, as well as also the structural integrity of the measuring transducer, are safely obtained, even in the case of extremely hot media, or in the case of temperature gradients strongly fluctuating within the tube arrangement as a function of time. Moreover, due to the symmetry characteristics of the tube arrangement, also those transverse forces caused by bending oscillations of curved measuring tubes can largely be neutralized, which—as discussed, among other things, in the initially mentioned EP-A 1 248 084 and U.S. Pat. No. 7,350,421—act essentially perpendicularly to the longitudinal section planes of the measuring transducer, or its tube arrangement and can be quite damaging for the accuracy of measurement of measuring transducers of vibration-type. Additionally, in the case of measuring transducers of the aforementioned type in comparison to conventional measuring transducers with only one or two bent measuring tubes, an increased oscillation quality factor of the measuring transducer, as a whole, could be detected, this being especially a result of a significantly lessened dissipation of oscillatory energy from the measuring transducer into the pipeline connected thereto, for instance, as a result of actually undesired deformation of the flow dividers. Moreover, oscillations of the measuring tubes of measuring transducers according to the present invention also are—in comparison to conventional measuring transducers—influenced to a significantly lesser degree by pressure jolts and sound.

A further advantage of the measuring transducer of the invention resides additionally in the fact that predominantly established, structural designs, such as regards materials used, joining technology, manufacturing steps, etc., can be applied, or must only be slightly modified, whereby also manufacturing costs are, in total, quite comparable to those of conventional measuring transducers. As a result, a further advantage of the invention is to be found in the fact that, thereby, not only an opportunity is created for implementing comparatively compact measuring transducers of vibration-type also with large nominal diameters of over 150 mm, especially with a nominal diameter of larger 250 mm, with manageable geometric dimensions and empty dimensions, but, additionally, also, this can be accomplished in an economically sensible manner.

The measuring transducer of the invention is, consequently, especially suitable for measuring flowable media guided in a pipeline having a caliber of larger 150 mm, especially of 300 mm or greater. Additionally, the measuring transducer is also suitable for measuring also mass flows, which are, at least at times, greater than 1000 t/h, especially, at least at times, amounting to more than 1500 t/h, such as can occur e.g. in the case of applications for measuring petroleum, natural gas or other petrochemical materials.

Figure 2:
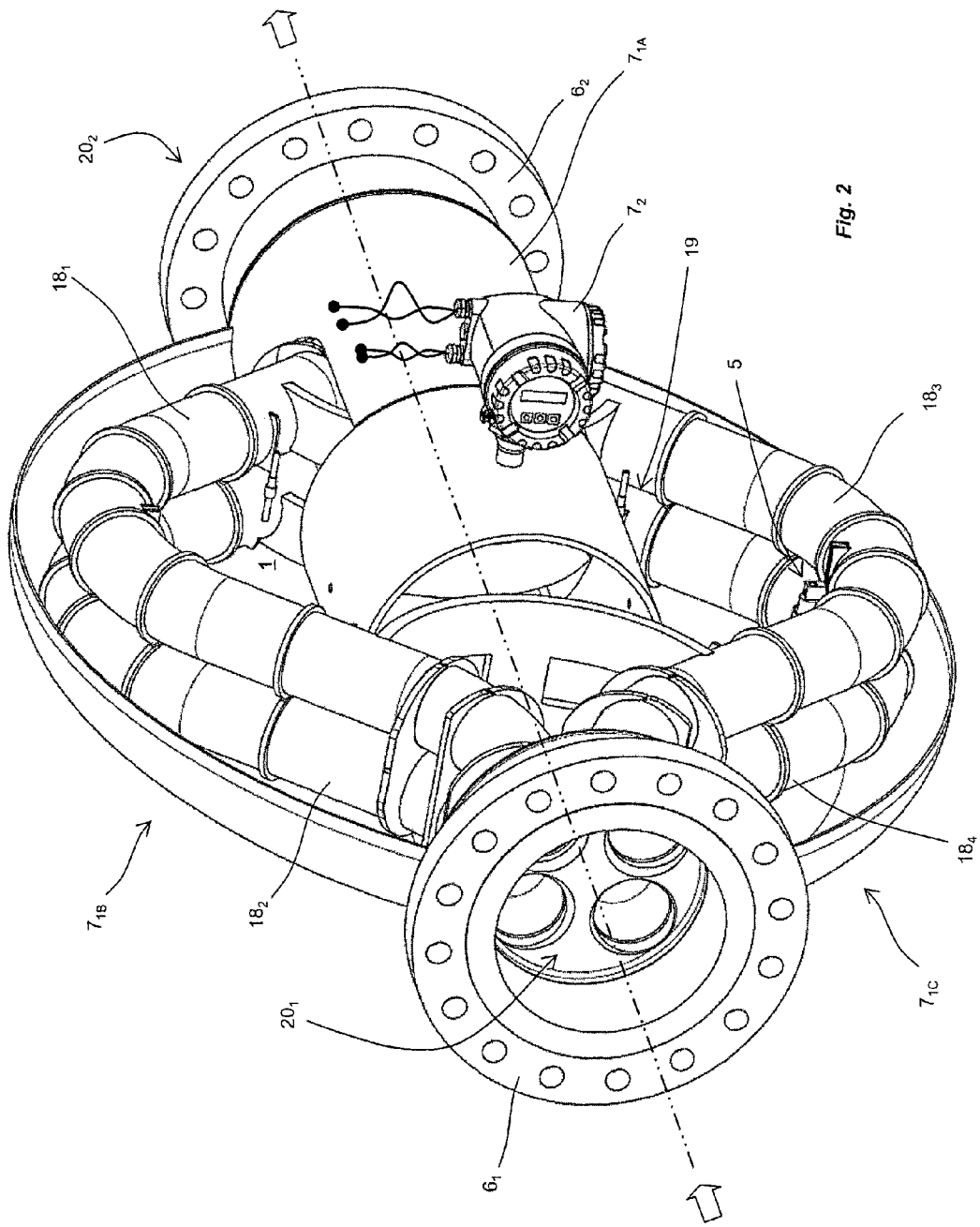
Figure 3A:
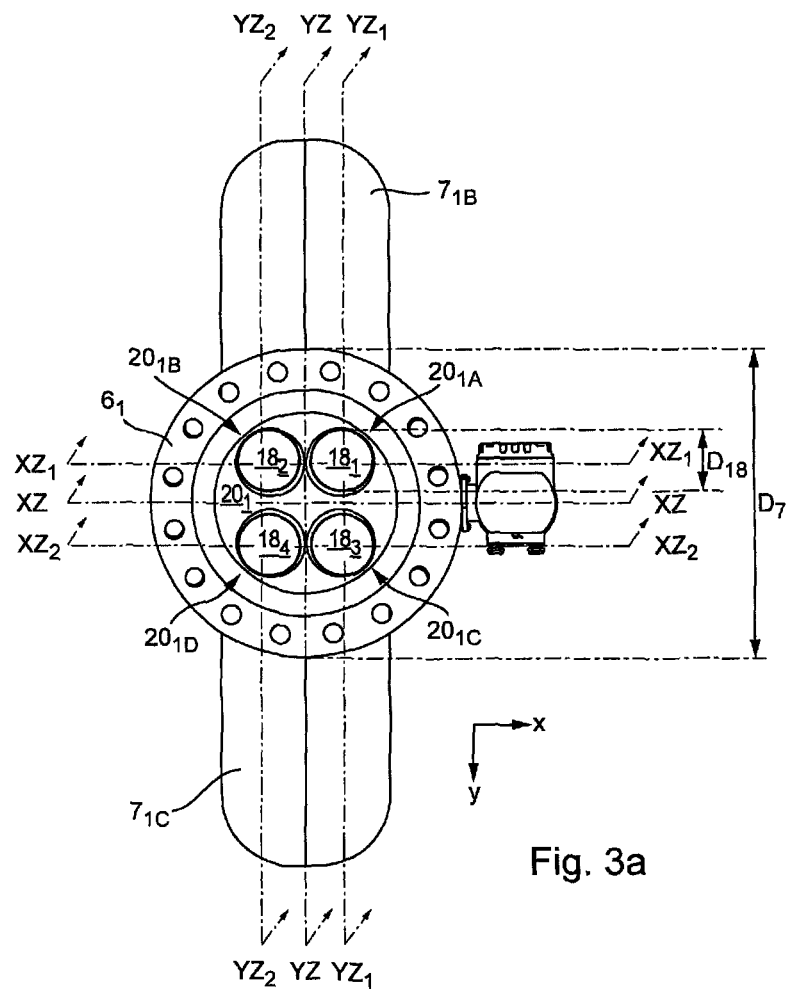
Figure 3B:
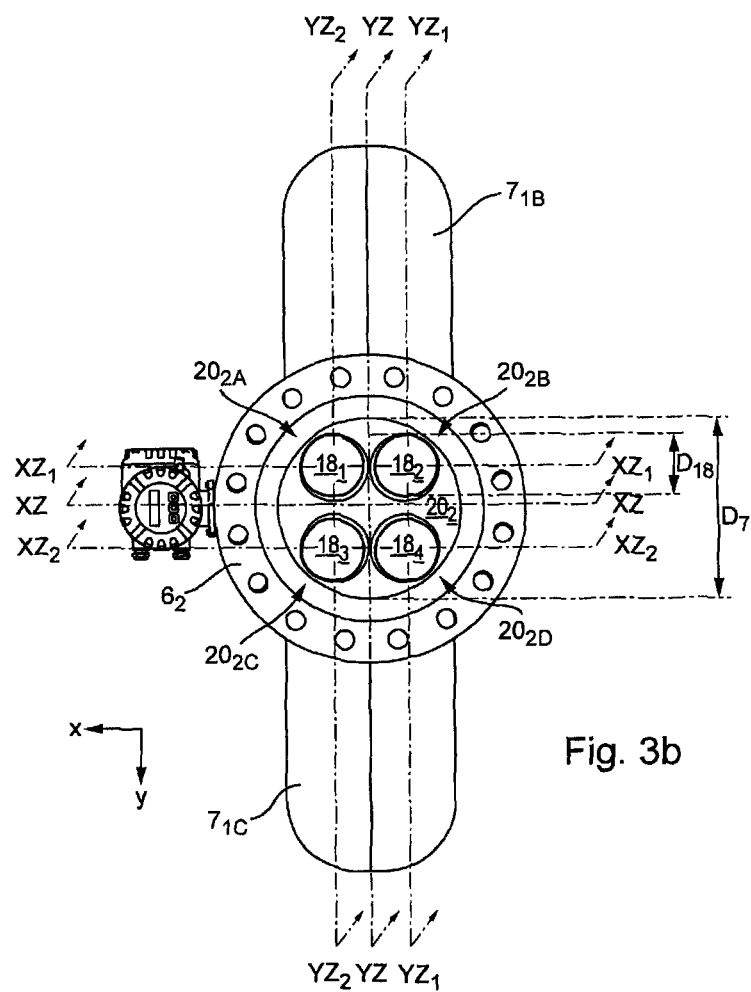
Figure 4A:
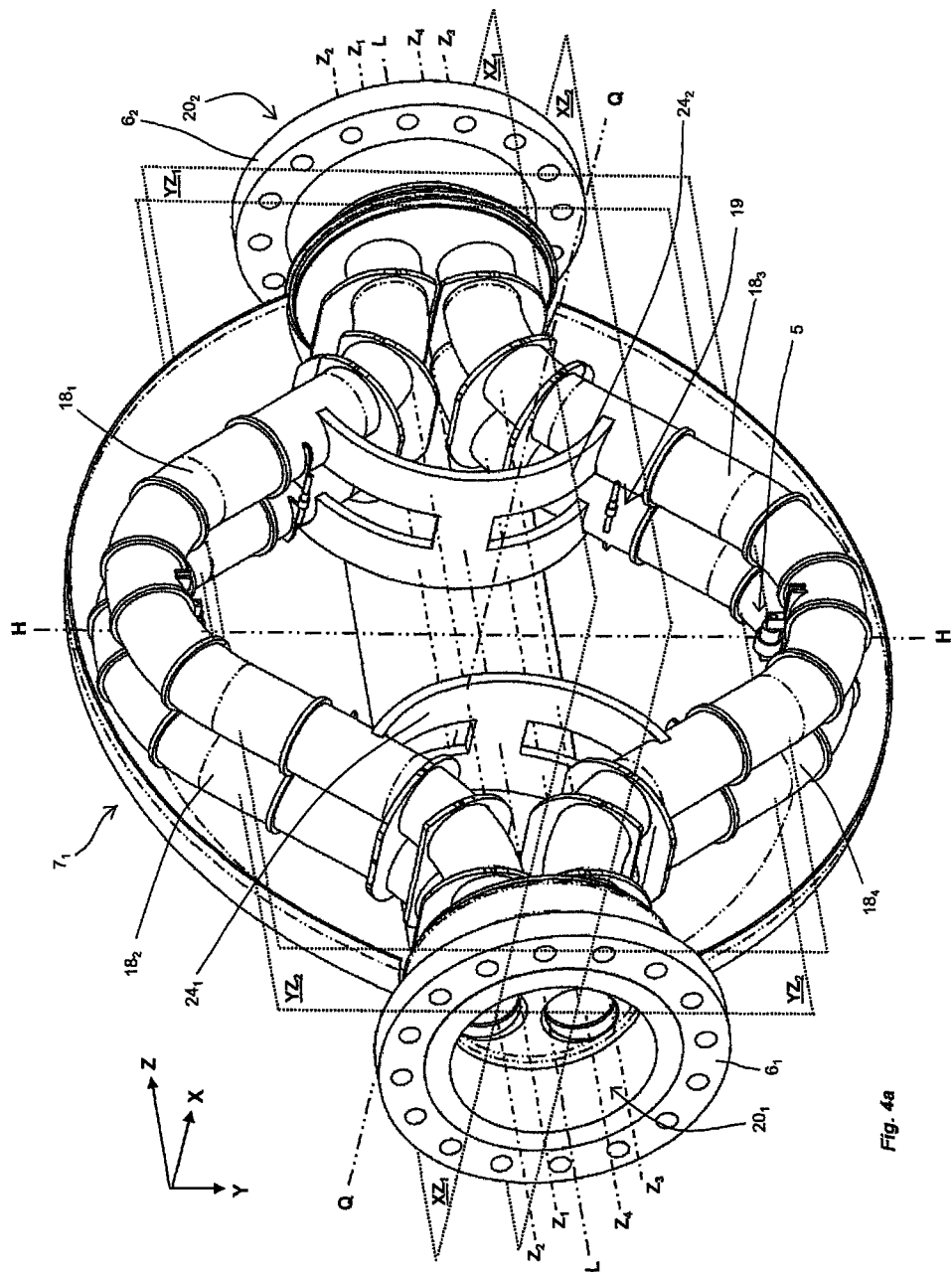
Figure 4B:
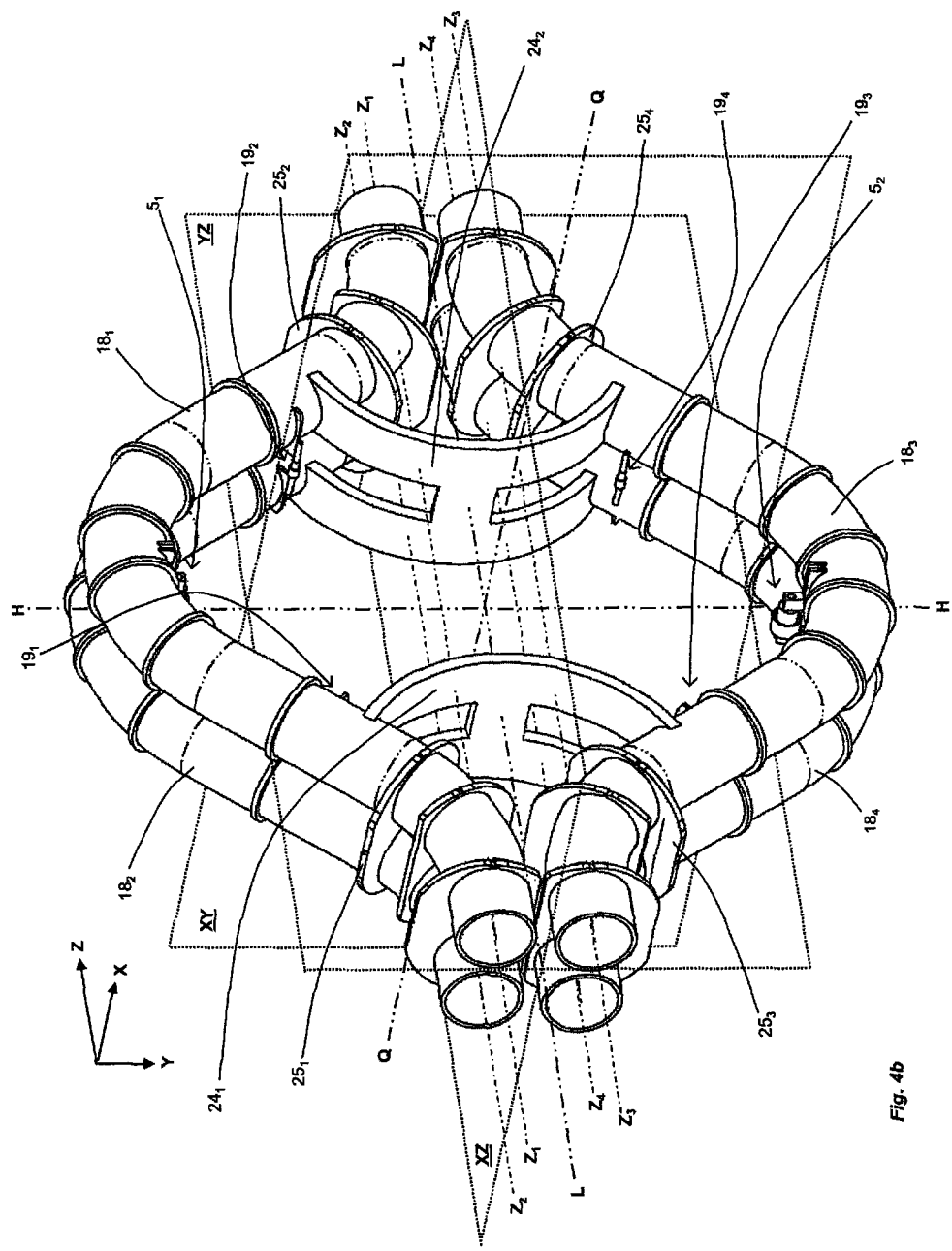
Figure 5A:
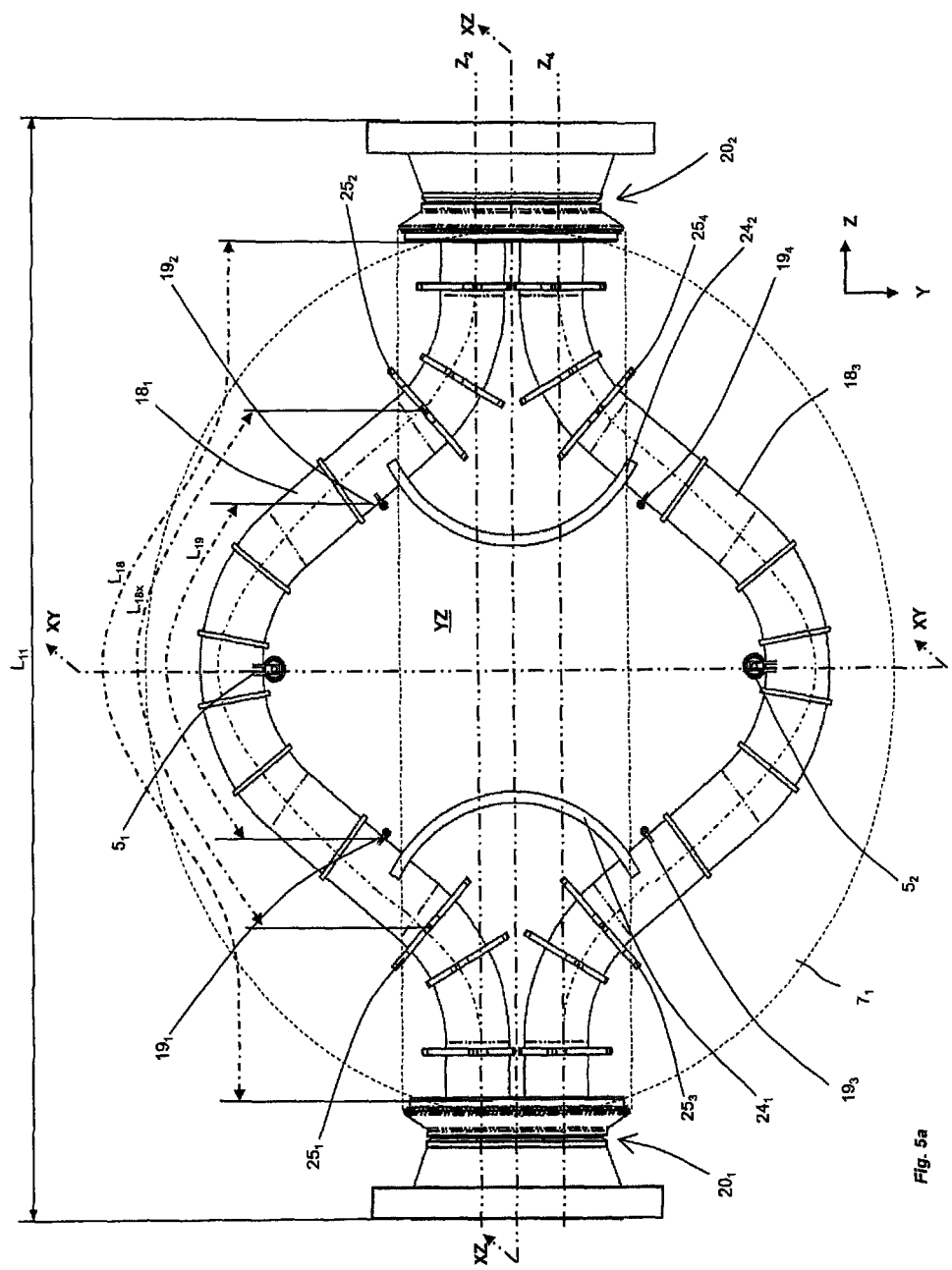
Figure 7B:
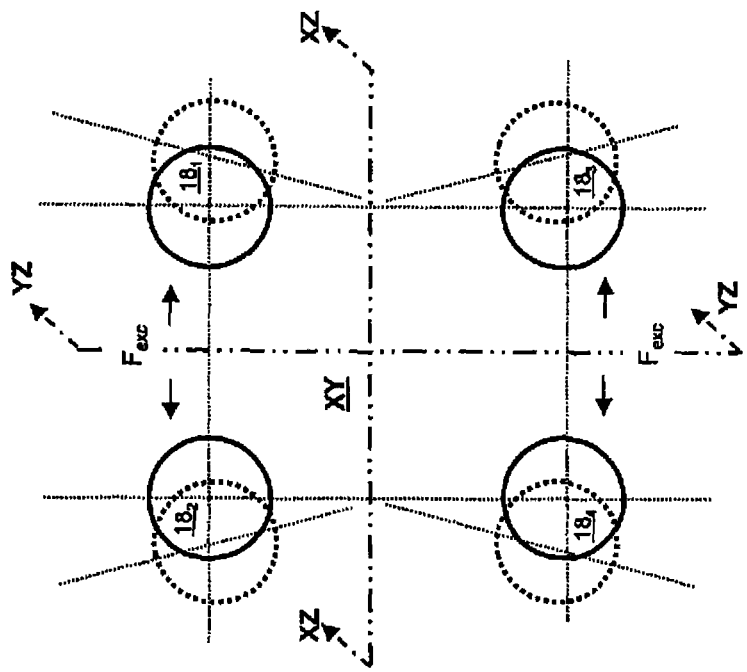
Figure 7A:
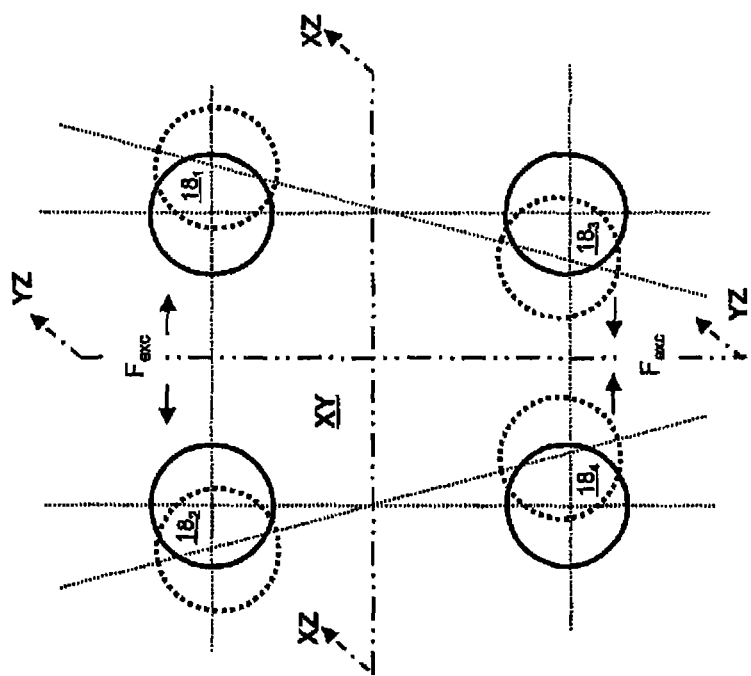

The invention, as well as other advantageous embodiments thereof, will now be explained in greater detail on the basis of examples of embodiments presented in the figures of the drawing. Equal parts are provided in the figures with equal reference characters; when required to avoid clutter or when it otherwise appears sensible, already mentioned reference characters are omitted in subsequent figures. Other advantageous embodiments or further developments, especially also combinations of first only individually explained aspects of the invention, will become evident additionally from the figures of the drawing, as well as also alone from the dependent claims. In particular, the figures of the drawing show as follows:

FIGS. 1,2 an in-line measuring device serving, for example, as a Coriolis flow/density/viscosity measuring device, in perspective, also partially sectioned, side views;

FIGS. 3a, 3b shows a projection of the in-line measuring device of FIG. 1 in two different side views;

FIG. 4a in perspective, side view, a measuring transducer of vibration-type having a tube arrangement formed by means of four bent measuring tubes and installed in an in-line measuring device of FIG. 1;

FIG. 4b the tube arrangement of FIG. 4a in perspective, side view;

FIGS. 5a,b a projection of the measuring transducer of FIG. 4a in two different side views;

FIGS. 6a,b projections of a tube arrangement of FIG. 4b in two different side views; and FIGS. 7a,b schematically, oscillation modes (V-mode; X-mode) of a tube arrangement of FIG. 4b, in each case in projection onto an imaginary cross sectional plane of said tube arrangement.

FIGS. 1, 2 show, schematically, a measuring system 1, especially a measuring system embodied as a Coriolis, mass flow, and/or density, measuring device, which serves, especially, for registering a mass flow m of a medium flowing in a pipeline (not shown) and for representing such in a mass flow, measured value representing this mass flow instantaneously. The medium can be practically any flowable material, for example, a powder, a liquid, a gas, a vapor, or the like. Alternatively or in supplementation, the measuring system 1 can, in given cases, also be used for measuring a density $\rho$ and/or a viscosity $\eta$ of the medium. Especially, the measuring system is provided for measuring media, such as e.g. petroleum, natural gas or other petrochemical materials, which are flowing in a pipeline having a caliber greater than 250 mm, especially a caliber of 300 mm or more. Especially, the measuring system is also provided for measuring flowing media of the aforementioned type, which are caused to flow with a mass flow rate of greater than 1000 t/h, especially greater than 1500 t/h.

Measuring system 1, shown here in the form of an in-line measuring device, namely a measuring device, which can be inserted into the course of a pipeline, comprises, for such purpose: A measuring transducer 11 of vibration-type, through which the medium being measured flows, during operation; as well as, electrically connected with the measuring transducer 11, a transmitter electronics 12 (which is here not shown in detail) for operating the measuring transducer and for evaluating oscillation signals delivered by the measuring transducer. In advantageous manner, the transmitter electronics 12, which is formed, for example, by means of one or more microprocessors and/or by means of one or more digital signal processors, can e.g. be so designed that, during operation of the measuring system 1, it can exchange measuring, and/or other operating, data with a measured value processing unit superordinated to it, for example, a programmable logic controller (PLC), a personal computer and/or a work station, via a data transmission system, for example, a hardwired fieldbus system and/or wirelessly per radio. Furthermore, the transmitter electronics 12 can be so designed, that it can be fed by an external energy supply, for example, also via the aforementioned fieldbus system. For the case, in which the measuring system 1 is provided for coupling to a fieldbus, or other communication, system, the transmitter electronics 12, for example, also a transmitter electronics, which is programmable on-site and/or via a communication system, can include, additionally, a corresponding communication interface for data communication, e.g. for sending the measured data to the already mentioned, programmable logic controller or a superordinated process control system and/or for receiving settings data for the measuring system.

FIGS. 4a, 4b, 5a, 5b, 6a, 6b show different representations of an example of an embodiment for a measuring transducer 11 of vibration-type suited for the measuring system 1, especially one serving as a Coriolis, mass flow, density and/or viscosity, transducer, which measuring transducer 11 is applied, during operation, in the course of a pipeline (not shown), through which a medium to be measured, for example, a powdered, liquid, gaseous or vaporous medium, is flowing. The measuring transducer 11 serves to produce, as already mentioned, in a medium flowing therethrough, such mechanical reaction forces, especially Coriolis forces dependent on the mass flow rate, inertial forces dependent on density of the medium and/or frictional forces dependent on viscosity of the medium, which react measurably, especially registerably by sensor, on the measuring transducer. Derived from these reaction forces describing the medium, by means of evaluating methods correspondingly implemented in the transmitter electronics in manner known to those skilled in the art, e.g. the mass flow rate m (thus, the mass flow), and/or the density and/or the viscosity of the medium can be measured.

The measuring transducer 11 includes a transducer housing $7_1$, which is, here, partially essentially tubular, and thus also externally partially circularly cylindrical, in which other components of the measuring transducer 11 serving for registering the at least one measured variable are accommodated to be protected against external, environmental influences, thus dust or water spray or also any other kinds of forces acting externally on the measuring transducer. An inlet-side, first housing end of the transducer housing $7_1$ is formed by means of an inlet-side, first flow divider $20_1$ and an outlet-side, second housing end of the transducer housing $7_1$ is formed by means of outlet-side, second flow divider $20_2$. Each of the two flow dividers $20_1$, $20_2$, which are, in this respect, formed as integral components of the housing, includes exactly four, for example, circularly cylindrical or tapered or conical, flow openings $20_{1A}$, $20_{1B}$, $20_{1C}$, $20_{1D}$, or $20_{2A}$, $20_{2B}$, $20_{2C}$, $20_{2D}$, each spaced from one another and/or each embodied as an inner cone.

Moreover, each of the flow dividers $20_1$, $20_2$, for example, manufactured of steel, is provided with a flange $6_1$, or $6_2$, for example, manufactured of steel, for connecting of the measuring transducer 11 to a tubular segment of the pipeline serving for supplying medium to the measuring transducer, or to a tubular segment of such pipeline serving for removing medium from the measuring transducer. Each of the two flanges $6_1$, $6_2$ has, according to an embodiment of the invention, a mass of more than 50 kg, especially more than 60 kg and/or less than 100 kg. For leakage free, especially fluid tight, connecting of the measuring transducer with the, in each case, corresponding tubular segment of the pipeline, each of the flanges includes additionally, in each case, a corresponding, as planar as possible, sealing surface $6_{1A}$, or $6_{2A}$. A distance between the two sealing surfaces $6_{1A}$, $6_{2A}$ of both flanges defines, thus, for practical purposes, an installed length, $L_{11}$, of the measuring transducer 11. The flanges are dimensioned, especially as regards their inner diameter, their respective sealing surface as well as the flange bores serving for accommodating corresponding connection bolts, according to the nominal diameter $D_{11}$ provided for the measuring transducer 11 as well as the therefor, in given cases, relevant industrial standards, corresponding to a caliber of the pipeline, in whose course the measuring transducer is to be used.

As a result of the large nominal diameter especially desired for the measuring transducer, its installed length $L_{11}$ amounts, according to an embodiment of the invention, to more than 1200 mm. Additionally, it is, however, provided that the installed length of the measuring transducer 11 is kept as small as possible, especially smaller than 3000 mm. The flanges $6_2$, $6_2$ can, as well as also directly evident from FIG. 4a and such as quite usual in the case of such measuring transducers, be arranged, for this purpose, as near as possible to the flow openings of the flow dividers $20_1$, $20_2$, in order so to provide an as short as possible inlet, or outlet, as the case may be, region in the flow dividers and, thus, in total, to provide an as short as possible installed length $L_{11}$ of the measuring transducer, especially an installed length $L_{11}$ of less than 3000 mm. For an as compact as possible measuring transducer and especially also in the case of desired high mass flow rates of over 1000 t/h, according to another embodiment of the invention, the installed length and the nominal diameter of the measuring transducer are so dimensioned and matched to one another, that a nominal diameter to installed length ratio $D_{11}/L_{11}$ of the measuring transducer, as defined by a ratio of the nominal diameter $D_{11}$ of the measuring transducer to the installed length $L_{11}$ of the measuring transducer is smaller than 0.3, especially smaller than 0.2 and/or greater than 0.1. In the example of an embodiment shown here, at least one middle segment $7_{1A}$ of the transducer housing $7_1$ is formed by means of a straight—here also circularly cylindrical and firstly three part—tube, so that for manufacturing the transducer housing $7_1$, for example, also standardized, consequently cost effective, welded or cast, standard tubes, for example, of cast steel or forged steel, can be used. As additionally directly evident from the combination of FIGS. 1 and 2, the middle segment $7_{1A}$ of the transducer housing $7_1$ can be formed, in such case, for example, also by means of a tube having approximately the caliber of the pipeline to be connected to, consequently corresponding to a nominal diameter $D_{11}$ of the measuring transducer, especially a tube corresponding as regards caliber, wall thickness and material of the pipeline to be connected to and, insofar, also correspondingly matched as regards the allowed operating pressure. Particularly for the case, in which the tubular middle segment, as well as also the flow dividers connected with the respective flanges in the in-, and outlet regions have, in each case, the same inner diameter, the transducer housing can additionally also be formed in a manner such that the flanges are formed or welded on the ends of the tube forming the middle segment, and that the flow dividers are formed by means of plates having the flow openings, especially plates somewhat spaced from the flanges and welded orbitally to the inner wall and/or by means of laser welding.

For conveying the medium flowing, at least at times, through pipeline and measuring transducer, the measuring transducer of the invention comprises, additionally, a tube arrangement having exactly four curved, or bent, for example at least sectionally circular arc shaped, and/or, as shown here schematically, at least sectionally V-shaped, measuring tubes $18_1$, $18_2$, $18_3$, $18_4$ held oscillatably in the transducer housing 10. The four measuring tubes, in this case, measuring tubes of equal length and pairwise parallel, communicate, in each case, with the pipeline connected to the measuring transducer and are, at least at times, especially also simultaneously, caused during operation to vibrate in at least one actively excited, oscillatory mode, the so-called wanted mode, suited for ascertaining the physical, measured variable. Of the four measuring tubes, a first measuring tube $18_1$ opens with an inlet-side, first measuring tube end into a first flow opening $20_{1A}$ of the first flow divider $20_1$ and with an outlet-side, second measuring tube end into a first flow opening $20_{2A}$ of the second flow divider $20_2$, a second measuring tube $18_2$ opens with an inlet-side, first measuring tube end into a second flow opening $20_{1B}$ of the first flow divider $20_1$ and with an outlet-side, second measuring tube end into a second flow opening $20_{2B}$ of the second flow divider $20_2$, a third measuring tube $18_3$ opens with an inlet-side, first measuring tube end into a third flow opening $20_{1C}$ of the first flow divider $20_1$ and with an outlet-side, second measuring tube end into a third flow opening $20_{2C}$ of the second flow divider $20_2$ and a fourth measuring tube $18_4$ opens with an inlet-side, first measuring tube end into a fourth flow opening $20_{1D}$ of the first flow divider $20_1$ and with an outlet-side, second measuring tube end into a fourth flow opening $20_{2D}$ of the second flow divider $20_2$. The four measuring tubes $18_1$, $18_2$, $18_3$, $18_4$ are, thus, connected to the flow dividers $20_1$, $20_2$, especially equally constructed flow dividers $20_1$, $20_2$, to form flow paths connected in parallel, and, indeed, in a manner enabling vibrations, especially bending oscillations, of the measuring tubes relative to one another, as well as also relative to the transducer housing. Additionally, it is provided, that the four measuring tubes $18_1$, $18_2$, $18_3$, $18_4$ are held oscillatably in the transducer housing $7_1$—here, namely, on its middle segment $7_{1A}$—only by means of said flow dividers $20_1$, $20_2$. Suited as material for the tube walls of the measuring tubes is, for example, stainless, in given cases, also high strength, stainless steel, titanium, zirconium or tantalum, or alloys formed therewith or also super alloys, such as, for instance, Hastelloy, Inconel etc. Moreover, the material for the four measuring tubes $18_1$, $18_2$, $18_3$, $18_4$, however, can also be practically any other material usually applied therefor or at least a material suitable therefor, especially such with an as small as possible thermal expansion coefficient and an as high as possible yield point. Alternatively, or in supplementation, are according to an additional embodiment of the invention, at least the first and second measuring tubes $18_1$, $18_2$ are of equal construction as regards the material of their tube walls, and/or as regards their geometric tube dimensions, especially a measuring tube length, a tube wall thickness, a tube outer diameter and/or a caliber. Additionally, also at least the third and the fourth measuring tube $18_3$, $18_4$ are of equal construction as regards the material of their tube walls, and/or as regards their geometric tube dimensions, especially a measuring tube length, a tube wall thickness, a tube outer diameter and/or a caliber, so that, as a result, the four measuring tubes $18_1$, $18_2$, $18_3$, $18_4$ are, at least pairwise, essentially of equal construction. Preferably, the four measuring tubes $18_1$, $18_2$, $18_3$, $18_4$ are of equal construction as regards the material of their tube walls are, and/or as regards their geometric tube dimensions, especially a measuring tube length, a tube wall thickness, a tube outer diameter, a form of their bending lines and/or a caliber, especially in such a manner, that, as a result, at least one minimum bending oscillation resonance frequency of each of the four measuring tubes $18_1$, $18_2$, $18_3$, $18_4$ (empty or uniformly flowed-through by a homogeneous medium) essentially equals the respective minimum bending oscillation resonance frequencies of the remaining other measuring tubes.

In the case of the measuring transducer of the invention, the measuring tubes are, as directly evident also from the combination of FIGS. 2, 4a and 4b, additionally so embodied and arranged in the measuring transducer, that the tube arrangement has, lying both between the first measuring tube $18_1$ and the third measuring tube $18_3$ as well as also between the second measuring tube $18_2$ and the fourth measuring tube $18_4$, a first imaginary longitudinal-section plane XZ, with respect to which the tube arrangement is mirror symmetric, and that the tube arrangement has further, perpendicular to its imaginary first longitudinal-section plane XZ, and extending both between the first measuring tube $18_1$ and second measuring tube $18_2$ as well as also between the third measuring tube $18_3$ and fourth measuring tube $18_4$, a second imaginary longitudinal-section plane YZ, with respect to which the tube arrangement likewise is mirror symmetric. As a result of this, not only are stresses generated by possible thermally related expansion of the measuring tubes within the tube arrangement minimized, but also transverse forces possibly induced by the bending oscillations of the bent measuring tubes within the tube arrangement and acting essentially perpendicularly to the line of intersection of the two aforementioned, imaginary, longitudinal-section planes can be largely neutralized, not lastly also those transverse forces mentioned, among other things, also in the initially mentioned EP-A 1 248 084 and U.S. Pat. No. 7,350,421, directed essentially perpendicularly to the first imaginary longitudinal-section plane XZ.

Especially also as evident from FIGS. 4a, 4b, 5a, 5b, in the example of an embodiment shown here, each of the four measuring tubes has a measuring tube peak, defined as the greatest perpendicular distance of the respective measuring tube from the first imaginary longitudinal section plane XZ. In the remaining includes the tube arrangement has, as also directly evident from the combination of FIGS. 4a-6b, an imaginary cross sectional plane XY perpendicular both to the first imaginary longitudinal section plane XZ as well as also to the second imaginary longitudinal section plane YZ. In an advantageous embodiment of the invention, the tube arrangement is additionally so embodied, that a center of mass of the tube arrangement lies in the imaginary cross sectional plane XY, or that the tube arrangement is mirror symmetric relative to the imaginary cross sectional plane XY, for instance, in such a manner, that the imaginary cross sectional plane XY intersects each of the four measuring tubes in its respective measuring tube peak.

For additional symmetrization of the measuring transducer and, thus, also for the additional simplifying of its construction, the two flow dividers $20_1$, $20_2$ are, according to an additional embodiment of the invention, additionally so embodied and so arranged in the measuring transducer, that, as also schematically presented in FIGS. 4a and 4b, an imaginary first connecting axis $Z_1$ of the measuring transducer imaginarily connecting the first flow opening $20_{1A}$ of the first flow divider $20_1$ with the first flow opening $20_{2A}$ of the second flow divider $20_2$ extends parallel to an imaginary second connecting axis $Z_2$ of the measuring transducer imaginarily connecting the second flow opening $20_{1B}$ of the first flow divider $20_1$ with the second flow opening $20_{2B}$ of the second flow divider $20_2$, and that an imaginary third connecting axis $Z_3$ of the measuring transducer imaginarily connecting the third flow opening $20_{1C}$ of the first flow divider $20_1$ with the third flow opening $20_{2C}$ of the second flow divider $20_2$ extends parallel to an imaginary fourth connecting axis $Z_4$ of the measuring transducer imaginarily connecting the fourth flow opening $20_{1B}$ the first flow divider $20_1$ with the fourth flow opening $202E$ the second flow divider $20_2$. As shown in FIGS. 4a and 4b, the flow dividers are additionally so embodied and so arranged in the measuring transducer, that the connecting axes $Z_1$, $Z_2$, $Z_3$, $Z_4$ also are parallel to a principal flow axis L of the measuring transducer essentially aligning with the pipeline and/or coincident with the aforementioned line of intersection of the two imaginary longitudinal-section planes XZ, YZ of the tube arrangement. Furthermore, the two flow dividers $20_1$, $20_2$ can additionally also be so embodied and so arranged in the measuring transducer, that a first imaginary longitudinal-section plane $XZ_1$ of the measuring transducer, within which the first imaginary connecting axis $Z_1$ and the second imaginary connecting axis $Z_2$ extend, is parallel to a second imaginary longitudinal-section plane $XZ_2$ of the measuring transducer, within which the imaginary third connecting axis $Z_3$ and the imaginary fourth connecting axis $Z_4$ extend.

Moreover, the measuring tubes are, according to an additional embodiment of the invention, additionally so embodied and so arranged in the measuring transducer, that the imaginary first longitudinal-section plane XZ of the tube arrangement, as, among other things, also evident from the combination of FIGS. 3a and 4a, lies between the aforementioned first imaginary longitudinal-section plane $XZ_1$ of the measuring transducer and the aforementioned second imaginary longitudinal-section plane $XZ_2$ of the measuring transducer, for example, also such that the first longitudinal-section plane XZ of the tube arrangement is parallel to the first and second longitudinal-section planes $XZ_1$, $XZ_2$ of the measuring transducer. Additionally, the measuring tubes are so embodied and arranged in the measuring transducer, that equally also the second imaginary longitudinal-section plane YZ of the tube arrangement extends between the third imaginary longitudinal-section plane $YZ_1$ of the measuring transducer and the fourth imaginary longitudinal-section plane $YZ_2$ of the measuring transducer, for instance, in such a manner, that the second imaginary longitudinal-section plane YZ of the tube arrangement is parallel to the third imaginary longitudinal-section plane $YZ_1$ of the measuring transducer and parallel to the fourth imaginary longitudinal-section plane $YZ_2$ of the measuring transducer. In the example of an embodiment shown here, the tube arrangement is, as directly evident from the combination of FIGS. 4a, 4b, 5a, 5b and 6a, additionally so embodied and so placed in the transducer housing, that, as a result, not only the shared line of intersection of the first and second imaginary longitudinal section planes XZ, YZ of the tube arrangement is parallel, or coincident with, the longitudinal axis L, but, also, a shared line of intersection of the first longitudinal section plane XZ and the cross sectional plane XY is parallel to an imaginary transverse axis Q of the measuring transducer perpendicular to the longitudinal axis L and a shared line of intersection of the second longitudinal section plane YZ and the cross sectional plane XY is parallel to an imaginary vertical axis H of the measuring transducer perpendicular to the longitudinal axis L.

In an additional advantageous embodiment of the invention, the flow openings of the first flow divider $20_1$ are additionally so arranged, that those imaginary areal center of gravity, which belong to the—here circularly shaped—cross sectional areas of the flow openings of the first flow divider form the vertices of an imaginary rectangle or of an imaginary square, wherein said cross sectional areas lie, again, in a shared imaginary, cross sectional plane of the first flow divider extending perpendicular to a longitudinal axis L of the measuring transducer—, for example, a longitudinal axis extending within the first longitudinal-section plane XZ of the tube arrangement, or parallel to or even coincident with the mentioned principal flow axis of the measuring transducer—, or perpendicular to the longitudinal-section planes of the measuring transducer. Additionally, also the flow openings of the second flow divider $20_2$ are so arranged, that imaginary areal centers of gravity associated with—here likewise circularly shaped—cross sectional areas of the flow openings of the second flow divider $20_2$ form the vertices of an imaginary rectangle, or square, wherein said cross sectional areas lie, again, in a shared imaginary, cross sectional plane of the second flow divider extending perpendicular to the mentioned main flow, or also longitudinal, axis, L of the measuring transducer, or perpendicular to the longitudinal-section planes of the measuring transducer. In an additional embodiment of the invention, the measuring tubes are so bent and so arranged in the measuring transducer, that a caliber to height ratio $D_{18}/Q_{18}$ of the tube arrangement, defined by a ratio of the caliber, $D_{18}$, of the first measuring tube to a maximal lateral expanse of the tube arrangement $Q_{18}$, measured from a peak of the first measuring tube to a peak of the third measuring tube, or measured from a peak of the second measuring tube to a peak of the fourth measuring tube, amounts to more than 0.05, especially more than 0.07 and/or less than 0.35, especially less than 0.2.

For the purpose of implementing an as compact as possible measuring transducer, especially also for the mentioned case, in which such should have a comparatively large nominal diameter of 250 mm or more, and/or that the measuring tubes are laterally comparatively spread out, the transducer housing $7_1$ can, as additionally directly evident from the combination of FIGS. 1 and 2, in advantageous manner, additionally be formed by providing that the transducer housing $7_1$ is formed by means of a tube and housing caps. The tube is here, for the purpose of simplified handling, for example, firstly three part, thus three individual segments joined together, and has corresponding lateral openings for the caps. The tube has—as already indicated—, for instance, the caliber of the pipeline to be connected to, thus a caliber corresponding to a nominal diameter $D_{11}$ of the measuring transducer. The housing caps $7_{1B}$, $7_{1C}$, especially equally-constructed housing caps, are affixed, for instance, welded, laterally to the tube ultimately forming the middle segment of the transducer housing, and extend laterally from the middle segment to encase the segments of the measuring tubes. Of the two housing caps $7_{1B}$, $7_{1C}$—as evident from the combination of FIGS. 1-4a—e.g. a first housing cap $7_{1B}$ caps a segment of the first measuring tube extending outwards on a first side from the middle segment—especially a middle segment serving also as support frame for the tube arrangement, and consequently formed as a support tube—and a segment of the second measuring tube extending outwards on the first side from the middle segment and a second housing cap $7_{1C}$, for instance, a second housing cap constructed equally to the first housing cap, caps a segment of the third measuring tube extending outwards from the middle segment on a second side lying opposite to the first side and a segment of the fourth measuring tube extending outwards from the middle segment on the second side. As a result of this, the measuring tubes $18_1$, $18_2$, $18_3$, $18_4$, or the therewith formed tube arrangement of the measuring transducer 11 are, as directly evident from the combination of FIGS. 1, 2 and 4a completely encased by the transducer housing $7_1$—formed here by means of the middle segment serving, especially, also as support tube, as well as by the two housing caps laterally affixed thereto. For the aforementioned case, in which the transducer housing is formed by means of the tubular middle segment and the thereto laterally affixed housing caps, the four measuring tubes $18_1$, $18_2$, $18_3$, $18_4$ and the transducer housing $7_1$ are, in an additional embodiment of the invention—especially also for the purpose of minimizing the installed mass of the total measuring transducer—matched to one another and additionally so dimensioned, that a support tube to measuring tube, inner diameter ratio of the measuring transducer, defined by a ratio of the largest inner diameter of the middle segment of the transducer housing formed as support tube to a caliber $D_{18}$ of the first measuring tube, is greater than 3 and/or smaller than 5, especially smaller than 4.

Moreover, used as material for the transducer housing $7_1$ can be steels, such as, for instance, structural steel, or stainless steel, or also other suitable, or usually suitable for such purpose, high strength materials. For most applications of industrial measurements technology, especially also in the petrochemical industry, additionally also measuring tubes of stainless steel, for example, also duplex steel, super duplex steel or another (high strength) stainless steel, can satisfy the requirements relative to mechanical strength, chemical resistance as well as thermal requirements, so that in numerous cases of application the transducer housing $7_1$, the flow dividers $20_1$, $20_2$, as well as also the tube walls of the measuring tubes $18_1$, $18_2$, $18_3$, $18_4$ can, in each case, be of steel of, in each case, sufficiently high quality, which, especially relative to the material- and manufacturing costs, as well as also the thermally related dilation behavior of the measuring transducer 11 during operation, can be advantageous. Moreover, the transducer housing $7_1$ additionally in advantageous manner can also be so embodied and so dimensioned, that, in the case of possible damages to one or a number of the measuring tubes, e.g. through crack formation or bursting, outflowing medium can be completely retained in the interior of the transducer housing $7_1$ up to a required maximal positive pressure, for as long as desired, wherein such critical state can, as, for example, also mentioned in the initially cited U.S. Pat. No. 7,392,709, be registered and signaled as early as possible by means of corresponding pressure sensors and/or based on operating parameters produced by the mentioned transmitter electronics 12 internally during operation. For simplifying transport of the measuring transducer, or of the total in-line measuring device formed therewith, additionally, as, for example, also provided in the initially mentioned U.S. Pat. No. 7,350,421, transport eyes can be provided on the inlet side and outlet sides affixed externally on the transducer housing.

As already initially mentioned, the reaction forces required for the measuring are effected in the measuring transducer 11 in the medium to be measured by causing the measuring tubes $18_1$, $18_2$, $18_3$, $18_4$ to oscillate, for example, simultaneously, in an actively excited oscillatory mode, the so-called wanted mode. For exciting oscillations the measuring tubes, especially also those in the wanted mode, the measuring transducer further comprises an exciter mechanism 5 formed by means of at least one electro-mechanical, for example, electro-dynamic, oscillation exciter acting on the measuring tubes $18_1$, $18_2$, $18_3$, $18_4$. Exciter mechanism 5 serves to cause each of the measuring tubes operationally at least at times to execute oscillations, especially bending oscillations, in the wanted mode and to maintain such oscillations with oscillation amplitude sufficiently large for producing in the medium, and for registering, the above named reaction forces suitable for the particular measuring, or these wanted oscillations. The at least one oscillation exciter, and thus the therewith formed exciter mechanism, serves, in such case, especially for converting an electrical excitation power $P_{exc}$ fed from the transmitter electronics—, for instance, by means of at least one electrical driver signal—into such, e.g. pulsating or harmonic, exciter forces $F_{exc}$, which act as simultaneously as possible, uniformly, however, with opposite sense, on at least two of the measuring tubes, for instance, the first and second measuring tubes and, in given cases, are also coupled mechanically from the two measuring tubes further onto the other two measuring tubes, and so effect oscillations in the wanted mode. The exciter forces $F_{exc}$ generated by converting electrical excitation power $P_{exc}$ fed into the exciter mechanism can in manner known, per se, to those skilled in the art, e.g. by means of an operating circuit provided in the transmitter electronics 12 and lastly delivering the driver signal, be tuned, for instance, by means of electrical current- and/or voltage controllers implemented in the operating circuit as regards their amplitude and, e.g. by means of an in operating circuit likewise provided phase control loop (PLL), as regards their frequency; compare, for this, for example, also U.S. Pat. Nos. 4,801,897 or 6,311,136. In an additional embodiment of the invention, it is, consequently, additionally provided, that the transmitter electronics, for generating the exciter forces, feeds required electrical excitation power into the exciter mechanism by means of at least one electrical driver signal, for example, an at least at times periodic driver signal, supplied to the oscillation exciter, and, thus, the exciter mechanism, for example, via connecting lines. The driver signal is variable with at least one signal frequency corresponding to an eigenfrequency of a natural mode of oscillation of the tube arrangement, for instance, the mentioned V-mode or the mentioned X-mode. For example, the at least one driver signal can also have a plurality of signal components with signal frequencies differing from one another, of which at least one signal component (for instance, one dominating as regards signal power) has a signal frequency corresponding to an eigenfrequency of a natural mode of oscillation of the tube arrangement, in which each of the four measuring tubes executes bending oscillations, for example, thus the mentioned bending oscillation mode of first type. Moreover, it can additionally be advantageous—, for instance, for the purpose of fitting the fed-in excitation power to that instantaneously actually necessary for a sufficient oscillation amplitude—, to make the at least one driver signal variable relative to a maximal voltage level (voltage amplitude) and/or a maximal electrical current level (electrical current amplitude)—, for instance, in such a manner, that, for example, exciter current flows through the cylindrical coil of the at least one oscillation exciter driven by a variable exciter voltage provided by means of said driver signal.

Goal of the active exciting of the measuring tubes to oscillations is, in particular, especially also for the case, in which the measuring system ultimately formed by means of the measuring transducer should be used for measuring mass flow, to induce by means of the measuring tubes vibrating in the wanted mode sufficiently strong Coriolis forces in the flowing medium, such that, as a result, additional deformations—consequently deformations corresponding to an oscillatory mode of higher order of the tube arrangement—the so-called Coriolis mode—of each of the measuring tubes can be effected with oscillation amplitude sufficient for the measuring. For example, the measuring tubes $18_1$, $18_2$, $18_3$, $18_4$ can by means of the thereto held, electro-mechanical exciter mechanism be excited to, especially simultaneous, bending oscillations, especially at an instantaneous mechanical eigenfrequency of the tube arrangement formed by means of the four measuring tubes $18_1$, $18_2$, $18_3$, $18_4$, in the case of which they are—at least predominantly—laterally deflected and, as directly evident for those skilled in the art from the combination of FIGS. 3a, 3b, 6a, 6b, 7a, 7b, caused to oscillate pairwise essentially opposite-equally relative to one another. This, especially, in such a manner, that each of the measuring tubes $18_1$, $18_2$, $18_3$, $18_4$ executes during operation at the same time vibrations at least at times and/or at least partially, in each case, formed as bending oscillations about an imaginary oscillatory axis connecting the first and the, in each case, associated second measuring tube end of the respective measuring tube, in each case parallel to the mentioned connecting axes $Z_1$, $Z_2$, $Z_3$, $Z_4$, wherein the four oscillatory axes in the example of an embodiment shown here are parallel to one another, as well as also to the imaginary longitudinal axis L of the total measuring transducer imaginarily connecting the two flow dividers and passing through a center of mass of the measuring transducer. In other words, the measuring tubes can, as quite usual in the case of measuring transducers of vibration-type having one or more, bent measuring tubes be caused, in each case, to oscillate at least sectionally in the manner of a terminally clamped cantilever, consequently thus with cantilever, bending oscillations, around, in each case, an imaginary oscillation axis parallel to at least two of the imaginary connecting axes $Z_1$, $Z_2$, $Z_3$, $Z_4$. In an embodiment of the invention, the exciter mechanism is additionally embodied in such a manner that, therewith, the first measuring tube $18_1$ and the second measuring tube $18_2$ are excitable to execute relative to the second imaginary longitudinal section plane YZ opposite equal, especially also relative to the second imaginary longitudinal section plane YZ symmetric, bending oscillations and the third measuring tube $18_3$ and the fourth measuring tube $18_4$ are excitable to execute relative to the second imaginary longitudinal section plane YZ opposite equal, especially also relative to the second imaginary longitudinal section plane YZ symmetric, bending oscillations. Alternatively thereto or in supplementation thereof, the exciter mechanism is according to an additional embodiment of the invention additionally embodied in such a manner that, therewith, the first measuring tube $18_1$ and the third measuring tube $18_3$ are excitable to execute relative to the second imaginary longitudinal section plane YZ opposite equal, for example, also relative to the second imaginary longitudinal section plane YZ symmetric, bending oscillations and the second measuring tube $18_2$ and the fourth measuring tube $18_4$ are excitable to execute relative to the second imaginary longitudinal section plane YZ opposite equal, for example, relative to the second imaginary longitudinal section plane YZ symmetric, bending oscillations.

In an additional embodiment of the invention, the measuring tubes $18_1$, $18_2$, $18_3$, $18_4$ are excited during operation by means of the exciter mechanism 5 additionally at least partially, especially predominantly, to wanted mode bending oscillations, which have a bending oscillation frequency, which, for instance, equals an instantaneous mechanical resonance frequency of the tube arrangement comprising the four measuring tubes $18_1$, $18_2$, $18_3$, $18_4$, consequently corresponds to an instantaneous eigenfrequency of a bending oscillation mode of the tube arrangement, or which lies at least in the vicinity of such an eigen- or resonance frequency. The instantaneous mechanical resonance frequencies of bending oscillations are, in such case, as is known, dependent in special measure on size, shape and material of the measuring tubes $18_1$, $18_2$, $18_3$, $18_4$, as well as also on an instantaneous density of the medium flowing through the measuring tubes and can, thus, during operation of the measuring transducer, vary within a quite some number of kilohertz wide, wanted frequency band. In the case of exciting the measuring tubes at an instantaneous resonance frequency, thus, on the one hand, based on the instantaneously excited oscillation frequency, an average density of the medium flowing through the four measuring tubes can be instantaneously easily ascertained. On the other hand, so also, the electrical power instantaneously required for maintaining the oscillations excited in the wanted mode can be minimized. Especially, the four measuring tubes $18_1$, $18_2$, $18_3$, $18_4$, are caused to oscillate, driven by the exciter mechanism, additionally, at least at times, with essentially equal oscillation frequency, especially, in each case, one and the same natural mechanical eigenfrequency, and, thus, a shared, natural mechanical eigenfrequency. In advantageous manner, the oscillatory behavior of the tube arrangement formed by means of the four measuring tubes $18_1$, $18_2$, $18_3$, $18_4$, as well as also the driver signals controlling the exciter mechanism, are additionally so matched to one another, that at least the oscillations of the four measuring tubes $18_1$, $18_2$, $18_3$, $18_4$ excited in the wanted mode so are developed that the first and second measuring tubes $18_1$, $18_2$ oscillate—, for instance, in the manner of two tuning fork tines essentially opposite equally to one another, consequently at least in the imaginary cross sectional plane XY with an opposing phase shift of, for instance, 180°, and also the third and the fourth measuring tube $18_3$, $18_4$ equally oscillate essentially opposite equally to one another.

Investigations on measuring systems with a measuring transducer of the type being discussed have additionally surprisingly shown that as wanted mode, especially also for ascertaining the mass flow rate as well as the density of the medium conveyed in the measuring transducer, especially, that tube arrangement inherent, natural, oscillatory mode is suited—in the following referred to as the bending oscillation, fundamental mode of first type or also as the V-mode oscillation—, in which, as also shown schematically in FIG.

7a, the first measuring tube and the second measuring tube execute relative to the second imaginary longitudinal section plane YZ opposite equal bending oscillations about, in each case, a static rest position associated with the respective measuring tube, and in which the third measuring tube and the fourth measuring tube execute relative to the second imaginary longitudinal section plane likewise opposite equal bending oscillations about, in each case, a static rest position associated with the respective measuring tube, and, indeed, such that—relative to the second imaginary longitudinal section plane YZ—said bending oscillations of the first measuring tube are also opposite equal to said bending oscillations of the third measuring tube, and that—relative to the second imaginary longitudinal section plane YZ—said bending oscillations of the second measuring tube are also opposite equal to said bending oscillations of the fourth measuring tube. The (here likewise formed as cantilever, bending oscillations around, in each case, an imaginary oscillation axis parallel to at least two of the imaginary connecting axes and causing the tube arrangement in projection on the cross sectional plane XY to appear, at times, V-shaped letting (compare FIG. 7a)) opposite equal bending oscillations of the first and second measuring tubes, or of the third and fourth measuring tube, in the V-mode are, in the case of a symmetrically constructed tube arrangement and a uniformly flowed through tube arrangement, additionally symmetrically developed relative to the second imaginary longitudinal section plane YZ. The special suitability of the V-mode as wanted mode for measuring transducers with four bent measuring tubes could, in such case, especially also be attributed especially to the for the oscillatory behavior of the measuring transducer—considered both spatially as well as also in time—, in such case, as a whole, very favorable resulting stress distribution in the measuring transducer, especially also in the region of the two flow dividers, as well as also to the equally favorable, consequently very small, oscillation related deformations of the measuring transducer in general, as well as also the flow dividers in particular.

Besides the aforementioned V-mode, the tube arrangement has additionally also a natural bending oscillation mode of second type—referenced in the following as the X-mode—, in which—as shown schematically in FIG. 7b—the first measuring tube and the second measuring tube execute relative to the second imaginary longitudinal section plane YZ opposite equal bending oscillations about the, in each case, associated static rest position and in which the third measuring tube and the fourth measuring tube execute relative to the second imaginary longitudinal section plane YZ opposite equal bending oscillations about, in each case, the associated static rest position, in contrast with the bending oscillations in the V-mode, however, in the manner, that—relative to the second imaginary longitudinal section plane YZ—said bending oscillations of the first measuring tube are also opposite equal to said bending oscillations of the fourth measuring tube, and that—relative to the second imaginary longitudinal section plane YZ—said bending oscillations of the second measuring tube are also opposite equal to said bending oscillations of the third measuring tube. In the case of symmetrically constructed and uniformly flowed through tube arrangements, moreover, also the (here, in turn, as cantilever, bending oscillations formed around, in each case, an imaginary oscillation axis parallel to at least two of the imaginary connecting axes and causing the tube arrangement in projection on the cross sectional plane XY to appear, at times, X-shaped (compare FIG. 7b)) bending oscillations in the X-mode are likewise symmetric relative to the second imaginary longitudinal section plane YZ. In order to assure a separate, especially also defined, exciting of the V-mode, or of the X-mode, over an as broad as possible operating range of the measuring transducer (characterized by, among other things during operation, fluctuating densities, mass flow rates, temperature distributions in the measuring transducer, etc.), according to an additional embodiment of the invention, the tube arrangement formed by means of the four measuring tubes, consequently the therewith formed, measuring transducer, is so dimensioned, that an eigenfrequency $f_{18V}$ of the bending oscillation mode of first type (V-mode) measurable, for example, in the case of a tube arrangement filled completely with water, is different from an eigenfrequency $f_{18X}$ of the bending oscillation mode of second type (X-mode) measurable especially in the case of a tube arrangement filled completely with water, and, respectively at the same time as the eigenfrequency $f_{18V}$ of the bending oscillation mode of first type (V-mode), for example, such that the eigenfrequencies $f_{18V}$, $f_{18X}$ of the two said bending oscillation modes (V-mode, X-mode) deviate from one another by 10 Hz or more. Especially also for the case of large nominal diameters of more than 150 mm, the tube arrangement is so embodied, that, said eigenfrequency $f_{18V}$ of the bending oscillation mode of first type is more than 10 Hz greater than said eigenfrequency $f_{18X}$ of the bending oscillation mode of second type. The exciter mechanism is, according to an additional embodiment of the invention, consequently, embodied in such a manner that, therewith, the first measuring tube $18_1$ and the second measuring tube $18_2$ are excitable during operation to opposite equal bending oscillations and the third measuring tube $18_3$ and the fourth measuring tube $18_4$ during operation to opposite equal bending oscillations, especially also bending oscillations corresponding to the bending oscillation mode of first type (V-mode) at its instantaneous eigenfrequency $f_{18V}$, and, respectively, bending oscillations corresponding to the bending oscillation mode of second type (X-mode) at its instantaneous eigenfrequency $f_{18V}$, the latter bending oscillations, in given cases, also simultaneously with the bending oscillations corresponding to the bending oscillation mode of first type (V-mode).

In an additional embodiment of the invention the exciter mechanism 5 is formed by means of a first oscillation exciter $\mathbf{5}_1$ acting, especially differentially, on the first measuring tube $18_1$ and the second measuring tube $18_2$, especially also for the purpose of exciting opposite equal bending oscillations of the first and second measuring tube and/or of the third and fourth measuring tube. Additionally, it is provided that serving as first oscillation exciter $\mathbf{5}_1$ is an oscillation exciter of electrodynamic type acting, especially differentially, on at least two of the measuring tubes $18_1$, $18_2$, $18_3$, $18_4$. Accordingly, the first oscillation exciter $\mathbf{5}_1$ is formed additionally by means of a permanent magnet held on the first measuring tube and a cylindrical coil held on the second measuring tube and permeated by the magnetic field of the permanent magnet, especially in the manner of a coil, plunging arrangement, in the case of which the cylindrical coil is arranged coaxially with the permanent magnet and the permanent magnet is embodied as an armature plunging within the coil.

For the purpose of increasing the efficiency of the exciter mechanism and, respectively, for the purpose of increasing the exciter forces generated therewith while simultaneously achieving an as symmetric as possible construction, the exciter mechanism comprises, in a further development of the invention, additionally a second oscillation exciter $\mathbf{5}_2$ acting, especially electrodynamically and/or differentially, on the third measuring tube $18_3$ and the fourth measuring tube $18_4$. The second oscillation exciter $\mathbf{5}_2$ is, in advantageous manner, embodied with equal construction to that of the first oscillation exciter $5_1$, at least insofar as it works analogously to its principle of action, for example, thus likewise is of electrodynamic type. In an additional embodiment, the second oscillation exciter $5_2$ is, consequently, formed by means of a permanent magnet held on the third measuring tube and a cylindrical coil held on the fourth measuring tube and permeated by the magnetic field of the permanent magnet. The two oscillation exciter $5_1$, $5_2$ of the exciter mechanism 5 can, in advantageous manner, be electrically serial interconnected, especially in such a manner, that a common driver signal consequently excites simultaneous oscillations of the measuring tubes $18_1$, $18_3$, $18_2$, $18_4$, for instance, bending oscillations in the V-mode and/or in the X-mode. Particularly for the earlier mentioned case, in which both bending oscillations in the V-mode as well as also bending oscillations in the X-mode should be actively excited by means of the two oscillation exciters $5_1$, $5_2$, it can be of advantage to so dimension the oscillation exciters $5_1$, $5_2$ and to so apply them to the tube arrangement, that, as a result, a transmission factor of the first oscillation exciter $5_1$, defined by a ratio of therein fed electrical excitation power to an exciter force effecting oscillations of the measuring tubes produced therewith, is different, at least within a frequency band including the V-mode and the X-mode, from a transmission factor of the second oscillation exciter $5_2$, defined by a ratio of therein fed electrical excitation power to an exciter force effecting oscillations of the measuring tubes produced therewith, for instance, in such a manner, that said transmission factors deviate from one another by 10% or more. This enables, for example, also a separated exciting of V- and X-modes, especially also in the case of serial switching of the two oscillation exciter $5_1$, $5_2$ and/or supplying the two oscillation exciter $5_1$, $5_2$ with a single, shared, driver signal, and can be achieved in the case of electrodynamic oscillation exciters $5_1$, $5_2$ in very simple manner e.g. by application of cylindrical coils with different impedances, or different turns numbers and/or by differently dimensioned permanent magnets, or permanent magnets of different magnetic materials. It should here additionally be mentioned that, although the oscillation exciter, or the oscillation exciters, of the exciter mechanism shown here in the example of an embodiment act, in each case, for instance, centrally on the respective measuring tubes, alternatively or in supplementation, also oscillation exciter acting instead on the inlet and on the outlet sides of the particular measuring tube can be used, for instance, in the manner of the exciter mechanisms proposed in U.S. Pat. Nos. 4,823,614, 4,831,885, or the US-A 2003/0070495.

As evident from FIGS. 2, 4a, 4b, 5a and 5b and usual in the case of measuring transducers of the type being discussed, additionally provided in the measuring transducer 11 is a sensor arrangement 19, for example, an electrodynamic sensor arrangement, reacting to vibrations of the measuring tubes $18_1$, $18_2$, $18_3$, or $18_4$, especially inlet, and outlet-side vibrations, especially bending oscillations excited by means of the exciter mechanism 5, for producing oscillation signals representing vibrations, especially bending oscillations, of the measuring tubes and influenced, for example, as regards a frequency, a signal amplitude and/or a phase position—relative to one another and/or relative to the driver signal—by the measured variable to be registered, such as, for instance, the mass flow rate and/or the density and a viscosity of the medium, respectively.

In an additional embodiment of the invention, the sensor arrangement is formed by means of an inlet-side, first oscillation sensor $19_1$, especially an electrodynamic, first oscillation sensor and/or a first oscillation sensor differentially registering at least oscillations of the first measuring tube $18_1$ relative to the second measuring tube $18_2$, as well as an outlet-side, second oscillation sensor $19_2$, especially an electrodynamic, second oscillation sensor and/or a second oscillation sensor differentially registering at least oscillations of the first measuring tube $18_1$ relative to the second measuring tube $18_2$, which two oscillation sensors deliver, respectively, a first, and a second, oscillation signal reacting to movements of the measuring tubes $18_1$, $18_2$, $18_3$, $18_4$, especially their lateral deflections and/or deformations. This, especially, in such a manner, that at least two of the oscillation signals delivered by the sensor arrangement 19 have a phase shift relative to one another, which corresponds to, or depends on, the instantaneous mass flow rate of the medium flowing through the measuring tubes, as well as, in each case, a signal frequency, which depends on an instantaneous density of the medium flowing in the measuring tubes. The two oscillation sensors $19_1$, $19_2$, for example, oscillation sensors constructed equally to one another, can, for such purpose—such as quite usual in the case of measuring transducers of the type being discussed—be placed essentially equidistantly from the first oscillation exciter $5_1$ in the measuring transducer 11. Moreover, the oscillation sensors of the sensor arrangement 19 can, at least, insofar as they are of equal construction to that of the at least one oscillation exciter of the exciter mechanism 5, work analogously to its principle of action, for example, thus be likewise of electrodynamic type. In a further development of the invention, the sensor arrangement 19 is additionally formed also by means of an inlet-side, third oscillation sensor $19_3$, especially an electrodynamic, oscillation sensor and/or an oscillation sensor differentially registering oscillations of the third measuring tube $18_3$ relative to the fourth measuring tube $18_4$, as well as an outlet-side, fourth oscillation sensor $19_4$, especially an electrodynamic, fourth oscillation sensor $19_4$ and/or an electrodynamic oscillation sensor differentially registering oscillations of the third measuring tube $18_3$ relative to the fourth measuring tube $18_4$. For additional improving of the signal quality, as well as also for simplifying the transmitter electronics 12 receiving the measurement signals, furthermore, the first and third oscillation sensors $19_1$, $19_3$ can be electrically in series interconnected, for example, in such a manner, that a combined oscillation signal represents combined inlet-side oscillations of the first and third measuring tubes $18_1$, $18_3$ relative to the second and fourth measuring tubes $18_2$, $18_4$. Alternatively or in supplementation, also the second and fourth oscillation sensors $19_2$, $19_4$ can be electrically in series interconnected in such a manner, that a combined oscillation signal of both oscillation sensors $19_2$, $19_4$ represents combined outlet-side oscillations of the first and third measuring tubes $18_1$, $18_3$ relative to the second and fourth measuring tubes $18_2$, $18_4$.

For the aforementioned case, that the oscillation sensors of the sensor arrangement 19, especially oscillation sensors constructed equally to one another, should register oscillations of the measuring tubes differentially and electrodynamically, the first oscillation sensor $19_1$ is formed by means of a permanent magnet held to the first measuring tube—here in the region of oscillations to be registered on the inlet side—and a cylindrical coil permeated by the magnetic field of the permanent magnet and held to the second measuring tube—here correspondingly likewise in the region of oscillations to be registered on the inlet side—, and the second oscillation sensor $19_2$ is formed by means of a permanent magnet held—in the region of oscillations to be registered on the outlet side—to the first measuring tube and a cylindrical coil permeated by the magnetic field of the permanent magnet and held to the second measuring tube—here correspondingly likewise in the region of oscillations to be registered on the outlet side.

Equally, additionally also the, in given cases, provided, third oscillation sensor $19_3$ can correspondingly be formed by means of a permanent magnet held to the third measuring tube and a cylindrical coil permeated by the magnetic field of the permanent magnet and held to the fourth measuring tube, and the, in given cases, provided, fourth oscillation sensor $19_4$ by means of a permanent magnet held to the third measuring tube and a cylindrical coil permeated by the magnetic field of the permanent magnet and held to the fourth measuring tube.

It is to be noted here additionally that, although, in the case of the oscillation sensors of the sensor arrangement 19 illustrated in the example of an embodiment, the oscillation sensor is, in each case, of electrodynamic type, thus, in each case, formed by means of a cylindrical magnet coil affixed to one of the measuring tubes and a therein plunging permanent magnet correspondingly affixed to an oppositely lying measuring tube, additionally also other oscillation sensors known to those skilled in the art, such as e.g. optoelectronic sensors, can be used for forming the sensor arrangement. Furthermore, such as quite usual in the case of measuring transducers of the type being discussed, supplementally to the oscillation sensors, other, especially auxiliary sensors, or sensors registering disturbance variables, can be provided in the measuring transducer, such as e.g. acceleration sensors for registering movements of the total measuring system caused by external forces and/or asymmetries in the tube arrangement, strain gages for registering expansions of one or more of the measuring tubes and/or the transducer housing, pressure sensors for registering a static pressure reigning in the transducer housing and/or temperature sensors for registering temperatures of one or more of the measuring tubes and/or the transducer housing, by means of which, for example, the ability of the measuring transducer to function and/or changes of the sensitivity of the measuring transducer to the measured variables primarily to be registered, especially the mass flow rate and/or the density, as a result of cross sensitivities, or external disturbances, can be monitored and, in given cases, correspondingly compensated. For assuring an as high as possible sensitivity of the measuring transducer to the mass flow, according to an additional embodiment of the invention, the measuring tubes and the oscillation sensors are so arranged in the measuring transducer, that a measuring length, $L_{19}$, of the measuring transducer corresponding to a separation between the first oscillation sensor $19_1$ and the second oscillation sensor $19_2$ measured along a deflection curve of the first measuring tube amounts to more than 500 mm, especially more than 600 mm. Particularly for creating an as compact as possible, nevertheless, however, for mass flow, an as sensitive as possible, measuring transducer, according to an additional embodiment of the invention, the oscillation sensors $19_1$, $19_2$, matched to the installed length $L_{11}$ of the measuring transducer, are so arranged in the measuring transducer, that a measuring length to installed length ratio $L_{19}/L_{11}$ of the measuring transducer, which is defined by a ratio of the measuring length to the installed length of the measuring transducer, amounts to more than 0.3, especially more than 0.4 and/or less than 0.7. Alternatively, or in supplementation, the oscillation sensors are, according to an additional embodiment of the invention, matched to the measuring tubes, so placed in the measuring transducer, that a caliber to measuring length ratio $D_{18}/L_{19}$, of the measuring transducer, which is defined by a ratio of the caliber $D_{18}$ of the first measuring tube to the mentioned measuring length $L_{19}$ of the measuring transducer, amounts to more than 0.05, especially more than 0.09.

The sensor arrangement 19 is additionally, as usual in the case of such measuring transducers, coupled in suitable manner, for example, hardwired via connecting lines, with a measuring circuit correspondingly provided in the transmitter electronics, for example, a measuring circuit formed by means of at least one microprocessor and/or by means of at least one digital signal processor. The measuring circuit receives the oscillation signals of the sensor arrangement 19 and generates therefrom, in given cases, also taking into consideration electrical excitation power fed by means of the at least one driver signal into the exciter mechanism, and, consequently, also therein converted, the initially mentioned measured values, which can represent, for example, a mass flow rate, a totalled mass flow and/or a density and/or a viscosity of the medium to be measured, and which, in given cases, can be displayed on-site and/or also sent in the form of digital measured data to a data processing system superordinated to the measuring system and there correspondingly further processed. Especially, the measuring circuit, and, consequently, the therewith formed transmitter electronics, are additionally provided and designed, based on electrical excitation power converted in the exciter mechanism, to generate, for example, periodically recurringly and/or on query, a viscosity measured value representing the viscosity of the flowing medium and/or, based on oscillation signals delivered by the measuring transducer, to generate, for example, periodically recurringly and/or on query, a mass flow measured value representing the mass flow rate of the flowing medium and/or, for example, periodically recurringly and/or on calling, a density measured value representing the density of the flowing medium.

The above mentioned application of differentially acting, oscillation exciters, or oscillation sensors introduces, among other things, also the advantage, that for operating the measuring transducer of the invention, also such established measuring, and operating, circuits can be used, such as have found broad application, for example, already in conventional Coriolis, mass flow and/or density measuring devices.

The transmitter electronics 12, including the therein realized measuring, and operating, circuits, can, furthermore, be accommodated, for example, in a separate electronics housing $7_2$, which is arranged removed from the measuring transducer or, such as shown in FIG. 1, is affixed directly on the measuring transducer 1, for example, externally on the transducer housing $7_1$, in order to form a single compact device. In the case of the here illustrated example of an embodiment, consequently, placed on the transducer housing $7_1$ is, additionally, a neck-like, transition piece serving for holding the electronics housing $7_2$. Within the transition piece can additionally be arranged a feedthrough for the electrical connecting lines between measuring transducer 11, especially the therein placed oscillation exciters and sensors, and the mentioned transmitter electronics 12. The feedthrough is manufactured to be hermetically sealed and/or pressure resistant, for example, by means of glass, and/or plastic potting compound.

As already multiply mentioned, the in-line measuring device and, thus, also the measuring transducer 11, is provided, especially, for measurements also of high mass flows of more than 1000 t/h in a pipeline of large caliber of more than 250 mm. Taking this into consideration, according to an additional embodiment of the invention, the nominal diameter of the measuring transducer 11, which, as already mentioned, corresponds to a caliber of the pipeline, in whose course the measuring transducer 11 is to be used, is so selected, that it amounts to more than 50 mm, especially, however, is greater than 100 mm. Additionally, according to a further embodiment of the measuring transducer, it is provided, that each of the measuring tubes $18_1$, $18_2$, $18_3$, $18_4$ has, in each case, a caliber $D_{18}$ corresponding to a particular tube inner diameter, which amounts to more than 40 mm. Especially, the measuring tubes $18_1$, $18_2$, $18_3$, $18_4$ are additionally so embodied, that each has a caliber $D_{18}$ of more than 60 mm. Alternatively thereto or in supplementation thereof, the measuring tubes $18_1$, $18_2$, $18_3$, $18_4$ are, according to another embodiment of the invention, additionally so dimensioned, that they have, in each case, a measuring tube length $L_{18}$ of at least 1000 mm. The measuring tube length $L_{18}$ corresponds, in the here illustrated example of an embodiment with equal length measuring tubes $18_1$, $18_2$, $18_3$, $18_4$, in each case, to a length of a section of the deflection curve of the first measuring tube extending between the first flow opening of the first flow divider and the first flow opening of the second flow divider. Especially, the measuring tubes $18_1$, $18_2$, $18_3$, $18_4$ are, in such case, so designed, that their measuring tube length $L_{18}$ is, in each case, greater than 1200 mm. Accordingly, there results, at least for the mentioned case, that the measuring tubes $18_1$, $18_2$, $18_3$, $18_4$ are composed of steel, in the case of the usually used wall thicknesses of over 1 mm, a mass of, in each case, at least 20 kg, especially more than 30 kg. One tries, however, to keep the empty mass of each of the measuring tubes $18_1$, $18_2$, $18_3$, $18_4$ smaller than 50 kg.

In consideration of the fact that, as already mentioned, each of the measuring tubes $18_1$, $18_2$, $18_3$, $18_4$, in the case of the measuring transducer of the invention, weighs well over 20 kg and, in such case, such as directly evident from the above dimensional specifications, can have a capacity of easily 10 l or more, the tube arrangement comprising then the four measuring tubes $18_1$, $18_2$, $18_3$, $18_4$ can, at least in the case of medium with high density flowing through, reach a total mass of far over 80 kg. Especially in the case of the application of measuring tubes with comparatively large caliber $D_{18}$, large wall thickness and large measuring tube length $L_{18}$, the mass of the tube arrangement formed by the measuring tubes $18_1$, $18_2$, $18_3$, $18_4$ can directly, however, also be greater than 100 kg or, at least with medium flowing through, e.g. oil or water, be more than 120 kg. As a result of this, an empty mass $M_{11}$ of the measuring transducer amounts, in total, also to far more than 200 kg, and, in the case of nominal diameters $D_{11}$ of significantly greater than 250 mm, even more than 300 kg. As a result, the measuring transducer of the invention can have a mass ratio $M_{11}/M_{18}$ of an empty mass $M_{11}$ of the total measuring transducer to an empty mass $M_{18}$ of the first measuring tube of easily greater than 10, especially greater than 15.

In order, in the case of the mentioned high empty mass $M_{11}$ of the measuring transducer, to employ the therefor, in total, applied material as optimally as possible and, thus, to utilize the—most often also very expensive—material, in total, as efficiently as possible, according to an additional embodiment, the nominal diameter $D_{11}$ of the measuring transducer is so dimensioned relative to its empty mass $M_{11}$, that a mass to nominal diameter ratio $M_{11}/D_{11}$ of the measuring transducer 11, as defined by a ratio of the empty mass $M_{11}$ of the measuring transducer 11 to the nominal diameter $D_{11}$ of the measuring transducer 11, is smaller than 2 kg/mm, especially as much as possible, however, smaller than 1 kg/mm. In order to assure a sufficiently high stability of the measuring transducer 11, the mass to nominal diameter ratio $M_{11}/D_{11}$ of the measuring transducer 11 is, at least in the case use of the above mentioned conventional materials, however, to be chosen as much as possible greater than 0.5 kg/mm. Additionally, according to an additional embodiment of the invention, for additional improvement of the efficiency of the installed material, the mentioned mass ratio $M_{11}/M_{18}$ is kept smaller than 25.

For creation of a nevertheless as compact as possible measuring transducer of sufficiently high oscillation quality factor and as little pressure drop as possible, according to an additional embodiment of the invention, the measuring tubes are so dimensioned relative to the above mentioned, installed length $L_{11}$ of the measuring transducer 11, that a caliber to installed length ratio $D_{18}/L_{11}$ of the measuring transducer, as defined by a ratio of the caliber $D_{18}$ at least of the first measuring tube to the installed length $L_{11}$ of the measuring transducer 11, amounts to more than 0.02, especially more than 0.05 and/or less than 0.09, especially less than 0.07. Alternatively or in supplementation, the measuring tubes $18_1$, $18_2$, $18_3$, $18_4$ are so dimensioned relative to the above mentioned installed length $L_{11}$ of the measuring transducer, that a measuring tube length to installed length ratio $L_{18}/L_{11}$ of the measuring transducer, as defined by a ratio of the above-referenced measuring tube length $L_{18}$ at least of the first measuring tube to the installed length $L_{11}$ of the measuring transducer, amounts to more than 0.7, especially more than 0.8 and/or less than 1.2.

For the purpose of tuning oscillation characteristics of the tube arrangement, especially also for the purpose of an as simple as possible and, equally as well, an effective implementing of a sufficient separating of the mentioned V-mode from the X-mode relative to their eigenfrequencies $f_{18V}$; $f_{18X}$, on the one hand, as well as, on the other hand, also for the purpose of improving the mechanical coupling of the four measuring tubes for equalizing the simultaneously executed oscillations of the four measuring tubes, at least the actively excited bending oscillations of the wanted mode, for instance, also in the case of possible inequalities due to component tolerances, the measuring transducer further comprises, in an additional embodiment of the invention, a first coupling element $24_1$ of first type spaced both from the first flow divider as well as also from the second flow divider and affixed on the inlet side to each of the four measuring tubes, for example, a first coupling element $24_1$ having an essentially X-shaped basic shape or, as in FIG. 4a or 4b schematically presented, an essentially H-shaped basic shape, for tuning eigenfrequencies of natural oscillation modes of the tube arrangement, as well as a second coupling element $24_2$ of first type spaced both from the first flow divider as well as also from the second flow divider and affixed on the outlet side to each of the four measuring tubes, for instance, a second coupling element $24_2$ essentially constructed equally to the first coupling element $24_1$ of first type, in given cases, also having an essentially X-shaped or essentially H-shaped basic shape, for tuning eigenfrequencies of natural oscillation modes of the tube arrangement. Each of the two coupling elements of first type can, in such case, additionally be so embodied and, in each case, so affixed to the measuring tubes, that its projection onto the mentioned imaginary cross sectional plane XY of the measuring transducer is X-shaped, or that, as presented in FIGS. 4a and 4b, its projection onto said cross sectional plane XY is H-shaped. The coupling elements $24_1$ of first type can, for example, in each case, be formed by means of plate shaped elements or, as schematically presented in FIGS. 4a, 4b, produced by means of a monolithic blanked, bent part. The two coupling elements of first type are in the example of an embodiment shown in FIG. 4a, 4b, or 5a, 5b additionally so embodied and placed on the measuring tubes, that they are essentially symmetrically relative to the mentioned first imaginary longitudinal section plane XZ of the measuring transducer, or relative to the mentioned second imaginary longitudinal section plane YZ of the measuring transducer, consequently, thus, the first imaginary longitudinal section plane XZ and/or the second imaginary longitudinal section plane YZ are/is, in each case, also a plane of symmetry of each of the two coupling elements of first type. The two coupling elements of first type in the measuring transducer are, moreover, also preferably symmetrical relative to the mentioned imaginary cross sectional plane XY of the measuring transducer and, consequently equidistant and parallel extending relative to said cross sectional plane XY. In case required,— for example, because the measuring transducer is provided for measuring extremely hot media, or for measuring in applications with operating temperature fluctuating over a broad range, for instance, as a result of recurringly in-situ performed, cleaning procedures of the measuring transducer ("cleaning in process", "sterilizing in process", etc.), and, as a result, mentionable thermal expansions of the measuring tubes are to be expected—the coupling elements $24_1$, $24_2$ of first type can additionally be so embodied, that they expand essentially equally as the thereby, in each case, coupled measuring tubes and/or that they are sufficiently flexible at least relative to forces, which extend in the direction of a line of action through the peaks of the two measuring tubes connected with one another by the particular coupling elements of second type, for instance, coincident with, or parallel to, the mentioned imaginary vertical axis V. The flexibility can be implemented, for example, by slits correspondingly formed in the particular coupling element—, for instance, extending essentially transversely to aforementioned line of action. Alternatively, or in supplementation to slits formed in the coupling elements, according to another embodiment of the invention, each of the two coupling elements of first type is, as directly evident from the combination of FIGS. 4a, 4b, 5a, 5b, bowed, especially for the purpose of achieving a sufficient flexibility in the direction of the imaginary vertical axis H. This is accomplished, especially, in such a manner that each of the two coupling element of first type is, as also indicated in FIG. 4a, 4b, 5a, 5b, at least sectionally, convex relative to the imaginary cross sectional plane XY extending between said coupling elements $24_1$, $24_2$, namely as seen from the cross sectional plane XY. As a result, a small change of the relative separation of the measuring tubes, for instance, as a result of thermally related strain, is accommodated, and, indeed, while largely preventing elevations of mechanical stresses influencing the oscillatory behavior of the tube arrangement significantly.

In case required, furthermore, mechanical stresses and/or vibrations possibly or at least potentially caused by the vibrating, especially in the mentioned manner, relatively large dimensioned, measuring tubes at the inlet side or at the outlet side in the transducer housing can e.g. be minimized by connecting the four measuring tubes $18_1$, $18_2$, $18_3$, $18_4$ with one another mechanically at least pairwise on the inlet side and on the outlet side, in each case, by means of coupling elements serving as so-called node plates—in the following referred to as coupling elements of second type. Moreover, by means of such coupling elements of first type, be it through their dimensioning and/or their positioning on the measuring tubes, mechanical eigenfrequencies of the measuring tubes and, thus, also mechanical eigenfrequencies of the tube arrangement formed by means of the four measuring tubes including thereon placed, additional components of the measuring transducer, consequently also the natural eigenfrequencies of its V-mode and its X-mode, respectively, and, thus, also the oscillatory behavior of the measuring transducer as a whole can, with targeting, be influenced.

The coupling elements of second type serving as node plates can, for example, be thin plates, or washers, manufactured especially from the same or a similar material as the measuring tubes, which, in each case, corresponding with the number and the outer dimensions of the measuring tubes to be coupled with one another, are provided with bores, in given cases, supplementally, slitted to the edge, so that the washers can first be mounted onto the respective measuring tubes $18_1$, $18_2$ and $18_3$, $18_4$, respectively, and, in given cases, thereafter still be bonded to the respective measuring tubes, for example, by hard soldering or welding.

Accordingly, the tube arrangement comprises in an additional embodiment of the invention, a first coupling element $24_1$ of second type, for example, a plate shaped, first coupling element $24_1$ of second type, which—as directly evident from FIGS. 4a, 5a, 5b, 6a—is affixed on the inlet side to the first measuring tube and to the second measuring tube and spaced from the first flow divider for forming inlet-side oscillation nodes at least for vibrations, especially also bending oscillations, for instance, those in the mentioned V-mode, of the first measuring tube and for thereto opposite equal vibrations of the second measuring tube, as well as a second coupling element $24_2$ of second type, for instance, one constructed equally to the first coupling element, which is affixed on the outlet side to the first measuring tube $18_1$ and to the second measuring tube $18_2$ and spaced from the second flow divider $20_2$ for forming outlet-side oscillation nodes for vibrations, especially also bending oscillations, thus those in the mentioned V-mode, or X-mode, of the first measuring tube $18_1$ and for thereto opposite equal vibrations of the second measuring tube $18_1$. Equally, the tube arrangement includes a third coupling element $25_3$ of second type (for instance one, in turn, plate shaped, and, respectively, constructed equally to the first coupling element $24_1$ of second type) affixed on the inlet side to the third measuring tube and to the fourth measuring tube and spaced from the first flow divider for forming inlet-side oscillation nodes for vibrations, especially the mentioned bending oscillations, of the third measuring tube and for thereto opposite equal vibrations of the fourth measuring tube, as well as a fourth coupling element $25_4$ of second type, for instance, one constructed equally to the first coupling element $25_1$ of second type, affixed on the outlet side to the third measuring tube and to the fourth measuring tube and spaced from the second flow divider for forming outlet-side oscillation nodes for vibrations, for instance, the mentioned bending oscillations, of the third measuring tube and for thereto opposite equal vibrations of the fourth measuring tube.

The four aforementioned coupling elements $25_1$, $25_2$, $25_3$, $25_4$ of second type, in an additional embodiment of the invention, are, as also directly evident from the combination of FIGS. 4a, 4b, 5a, 5b, 6a, 6b, in each case, affixed to exactly two, otherwise, however, to no others of the four measuring tubes, so that, as a result, the first and second coupling elements $25_1$, $25_2$ of second type are affixed only to the first and second measuring tubes and the third and fourth coupling element $25_3$, $25_4$ of second type are affixed only to the third and fourth measuring tubes. As a result of this, the tube arrangement, consequently also the measuring transducer, can be manufactured e.g. in a manner such that, first, the first and second coupling elements $25_1$, $25_2$ of second type are affixed, in each case, to the (henceforth) first and second measuring tubes $18_1$, $18_2$ for forming a first measuring tube package and the third and fourth coupling elements $25_3$, $25_4$ of second type affixed, in each case, to the (henceforth) third and fourth measuring tubes $18_3$, $18_4$ for forming a second measuring tube package. Then, it is possible to join together for the tube arrangement the two measuring tube packages at a later point in time, for instance, directly before or also first after insertion of the two measuring tube packages into the mentioned tubular middle segment $7_{1A}$ of the (henceforth) transducer housing, by corresponding affixing of the first and second coupling elements $24_1$, $24_2$ of first type to each of the two measuring tube packages, for instance, interim, in each case, to at least one of the measuring tubes $18_1$, $18_2$ of the first measuring tube package and to at least one of the measuring tubes $18_3$, $18_4$ of the second measuring tube package. This has—especially also for the mentioned case, in which the measuring transducer is designed for large nominal diameters of more than 100 mm, in spite of the relatively large dimensions of its components, consequently, of the tube arrangement, the transducer housing, the flow dividers, etc.—the advantage, that the, as a result, relatively spread-out tube arrangement needs to be handled as a total piece only at a relatively late point in the time of the total manufacturing process. Moreover, this permits use of long existant, conventional measuring transducer technology for double tube arrangements, which brings a considerable reducing of the manufacturing- and inventory costs. In case required, the coupling elements $25_1$, $25_2$, $25_3$, $25_4$ can, however, also in corresponding manner, in each case, be affixed to all four measuring tubes, for example, also in the case, in which the measuring transducer is designed for relatively small nominal diameters of 50 mm or less.

In the example of an embodiment shown here, the first coupling element $25_1$ of second type is affixed both to a—here sectionally bent—inlet-side tube segment of the first measuring tube $18_1$ extending between the first flow divider $20_1$ and the first coupling element $24_1$ of first type as well as also to an inlet-side tube segment of the second measuring tube $18_2$ extending equally between the first flow divider $20_1$ and the first coupling element $24_1$ of first type, and the second coupling element $25_2$ of second type is affixed both to a—here likewise sectionally bent—outlet-side tube segment of the first measuring tube $18_1$ extending between the second flow divider $20_2$ and the second coupling element $24_2$ of first type as well as also to an outlet-side tube segment of the second measuring tube $18_2$ extending equally between the second flow divider $20_2$ and the second coupling element $24_2$ of first type. In analogous manner, the third coupling element $25_3$ of second type is affixed both to a—here likewise sectionally bent—inlet-side tube segment of the third measuring tube $18_3$ extending between the first flow divider $20_1$ and the first coupling element $24_1$ of first type as well as also to an inlet-side tube segment of the fourth measuring tube $18_4$ extending equally between the first flow divider $20_1$ and the first coupling element $24_1$ of first type and the fourth coupling element $25_4$ of second type is affixed both to a—here, in turn, sectionally bent—outlet-side tube segment of the third measuring tube $18_3$ extending between the second flow divider $20_2$ and the second coupling element $24_2$ of first type as well as also tp an outlet-side tube segment of the fourth measuring tube $18_4$ extending equally between the second flow divider $20_2$ and the second coupling element $24_1$ of first type. This, especially, in such a manner that—as directly evident from the combination of FIGS. 4a, 4b, 5a, 5b—at least the first and fourth coupling elements of second type are parallel to one another and at least the second and third coupling elements of second type are parallel to one another. Each of the four aforementioned coupling elements $25_1$, $25_2$ of second type, especially ones constructed equally to one another, is, according to an additional embodiment of the invention, additionally embodied plate shaped, for example, in such a manner, that it has, in each case, a rectangular basic shape, or, however, as shown in FIGS. 4a, 4b, a more oval basic shape. As additionally evident from the combination of FIGS. 4a, 4b, 5a, 5b, the four coupling elements $24_1$, $24_2$ $24_3$, $24_4$ can additionally be so embodied and so placed in the measuring transducer, that they are arranged symmetrically relative to the imaginary longitudinal section plane YZ and pairwise symmetrically relative to the imaginary longitudinal section plane XZ and relative to the imaginary cross sectional plane XY. As a result, thus, a center of mass of each of the coupling elements of second type, in each case, has the same distance to a center of mass of the tube arrangement. It can additionally, in the sense of a still simpler and still more exact adjusting of the oscillatory behavior of the measuring transducer, be quite advantageous, when the measuring transducer has, as, for example, provided in US-A 2006/0150750 and as indicated in FIGS. 4a, 4b, 5a, 5b, moreover, still other coupling elements of the aforementioned type acting as node plates, for example, thus, in total, 8 or 12 coupling elements of second type.

Figure 5B:
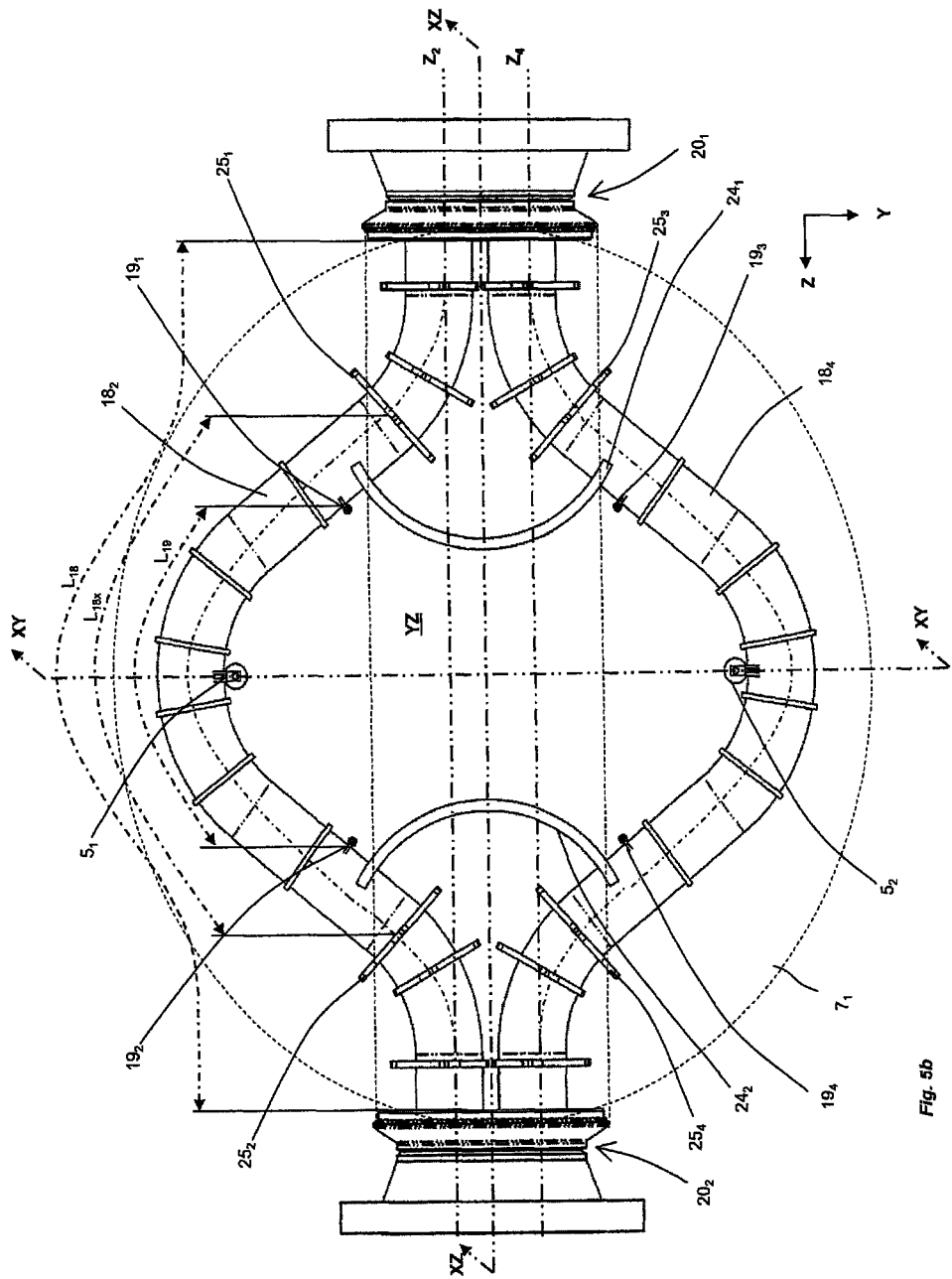

As schematically presented in FIGS. 5a and 5b, the tube form of each of the measuring tubes together with a minimum distance between the first and second coupling elements of second type—consequently thus in the case of application of 8 or more of such coupling elements, the coupling elements of second type lying on the in- and outlet sides, in each case, nearest the center of mass of the tube arrangement, insofar, thus the coupling elements of second type innermost on the in- and outlet sides, in each case, a wanted oscillatory length, $L_{18x}$, of each of the measuring tubes. The wanted oscillatory length, $L_{18x}$, of the respective measuring tubes corresponds, in such case, as also schematically presented in FIGS. 5a and 5b, in such case, to a length of the section of the bent line of the said measuring tube extending between the two coupling elements $25_1$, $25_2$ of second type, wherein according to an additional embodiment of the invention, the coupling elements of second type are so placed in the measuring transducer, that, as a result, the wanted, oscillatory length of each of the measuring tubes $18_1$, $18_2$, $18_3$, $18_4$ amounts to less than 3000 mm, especially less than 2500 mm and/or more than 800 mm. Alternatively, or in supplementation, it is additionally provided to so construct the measuring tubes and to so arrange the coupling elements of first type, that all four measuring tubes $18_1$, $18_2$, $18_3$, $18_4$, as a result, have the same wanted, oscillatory length, $L_{18x}$. According to an additional embodiment of the invention, additionally, the first measuring tube and the second measuring tube are, at least in the region extending between the first coupling element of second type and the second coupling element of second type—consequently thus in their respective wanted, oscillatory lengths—parallel to one another, and also the third measuring tube and the fourth measuring tube are, at least in the region extending between the third coupling element of second type and the fourth coupling element of second type—consequently thus their respective wanted, oscillatory lengths—parallel to one another.

For creation of an as compact as possible measuring transducer of sufficiently high oscillation quality factor and high sensitivity coupled with an as little as possible pressure drop, according to an additional embodiment of the invention, the measuring tubes $18_1$, $18_2$, $18_3$, $18_4$ are, matched to the mentioned, wanted, oscillatory length, so dimensioned, that a caliber to oscillatory length ratio $D_{18}/L_{18x}$ of the measuring transducer, defined by a ratio of the caliber $D_{18}$ of the first measuring tube to the wanted, oscillatory length $L_{18x}$ of the first measuring tube, amounts to more than 0.03, especially more than 0.05 and/or less than 0.15. Alternatively, or in supplementation, to this, according to an additional embodiment of the invention, the measuring tubes $18_1$, $18_2$, $18_3$, $18_4$ are, matched to the above mentioned installed length $L_{11}$ of the measuring transducer, so dimensioned, that an oscillatory length to installed length ratio $L_{18x}/L_{11}$ of the measuring transducer, defined by a ratio of the wanted, oscillatory length $L_{18x}$ of the first measuring tube to the installed length $L_{11}$ of the measuring transducer, amounts to more than 0.55, especially more than 0.6 and/or less than 1.5. According to an additional embodiment of the invention, the oscillation sensors are, matched to the wanted oscillatory length, so arranged in the measuring transducer, that a measuring length to oscillatory length ratio $L_{19}/L_{18x}$ of the measuring transducer, defined by a ratio of the mentioned measuring length $L_{19}$ of the measuring transducer to the wanted, oscillatory length $L_{18x}$ of the first measuring tube, amounts to more than 0.3, especially more than 0.4 and/or less than 0.95. Moreover, the measuring length, $L_{19}$, and/or measuring length to oscillatory length ratio $L_{19}/L_{18x}$ can, moreover, also be more exactly determined according to criteria proposed in assignee's not pre-published international applications PCT/EP2010/058797 and PCT/EP2010/058799 for determining optimum measuring lengths, or optimum measuring length to oscillatory length ratios for measuring transducers of vibration-type.

For lessening possible cross sensitivities of the measuring transducer on pressure, especially also in the case of an as high as possible nominal diameter to installed length ratio $D_{11}/L_{11}$ of greater than 0.1 and an as low as possible oscillatory length to installed length ratio $L_{18x}/L_{11}$ of less than 1.5, in advantageous manner, additionally, annular stiffening elements can be used on the measuring tubes, of which each is so placed on exactly one of the measuring tubes $18_1$, $18_2$, $18_3$, $18_4$, that it grips around such along one of its, especially circular orbiting, imaginary peripheral lines; compare, for this, also the initially mentioned U.S. Pat. No. 6,920,798. Especially, it can, in such case, be of advantage, when on each of the measuring tubes $18_1$, $18_2$, $18_3$, or $18_4$, at least four such stiffening elements, especially equally constructed stiffening elements, are placed. The stiffening elements can, in such case, for example, be so placed in the measuring transducer 11, that two adjoining stiffening elements mounted on the same measuring tube have a separation from one another, which amounts to at least 70% of a pipe outer-diameter of said measuring tube, at most, however, 150% of such pipe outer-diameter. Proved as especially suitable has been, in such case, a separation from one another of neighboring stiffening elements lying in the range of 80% to 120% of the pipe-outer diameter of the respective measuring tube $18_1$, $18_2$, $18_3$, or $18_4$.

Through the application of four instead of, such as to this point, two bent measuring tubes flowed-through in parallel, it is then also possible to manufacture, cost effectively, measuring transducers of the described type also for large mass flow rates, or with large nominal diameters of far over 250 mm, on the one hand, with an accuracy of measurement of over 99.8% at an acceptable pressure drop, especially of less than 3 bar, and, on the other hand, to keep the installed mass, as well as also the empty mass, of such measuring transducers sufficiently in limits, that, in spite of large nominal diameter, manufacture, transport, installation, as well as also operation can always still occur economically sensibly. Especially also through implementing of above explained measures for further developing the invention—individually or also in combination—, measuring transducers of the type being discussed can also, in the case of large nominal diameter, be so embodied and so dimensioned, that a mass ratio of the measuring transducer, as defined by a ratio of the mentioned empty mass of the measuring transducer to a total mass of the tube arrangement can be kept directly smaller than 3, especially smaller than 2.5.

The invention claimed is:

1. A measuring transducer of vibration-type for registering at least one physical, measured variable of a flowable medium guided in a pipeline and/or for producing Coriolis forces serving for registering a mass flow rate of a flowable medium guided in a pipeline, said measuring transducer comprising:

a transducer housing with an inlet-side, first housing end formed by means of an inlet-side, first flow divider including four, mutually spaced, flow openings and with an outlet-side, second housing end formed by means of an outlet-side, second flow divider including exactly four, mutually spaced, flow openings;

a tube arrangement including four, curved, or bent measuring tubes, which are connected to the flow dividers for guiding flowing medium along flow paths connected in parallel, of which:

a first measuring tube opens with an inlet-side, first measuring tube end into a first flow opening of the first flow divider and with an outlet-side, second measuring tube end into a first flow opening of the second flow divider, a second measuring tube opens with an inlet-side, first measuring tube end into a second flow opening of the first flow divider and with an outlet-side, second measuring tube end into a second flow opening of the second flow divider, a third measuring tube opens with an inlet-side, first measuring tube end into a third flow opening of the first flow divider and with an outlet-side, second measuring tube end into a third flow opening of the second flow divider and a fourth measuring tube opens with an inlet-side, first measuring tube end into a fourth flow opening of the first flow divider and with an outlet-side, second measuring tube end into a fourth flow opening of the second flow divider; and an electro-mechanical exciter mechanism for producing and/or maintaining bending oscillations each of the four measuring tubes, the two flow dividers being embodied and arranged in the measuring transducer, that an imaginary first connecting axis of the measuring transducer imaginarily connecting the first flow opening of the first flow divider with the first flow opening of the second flow divider extends parallel to an imaginary second connecting axis of the measuring transducer imaginarily connecting the second flow opening of the first flow divider with the second flow opening of the second flow divider, and that an imaginary third connecting axis of the measuring transducer imaginarily connecting the third flow opening of the first flow divider with the third flow opening of the second flow divider extends parallel to an imaginary fourth connecting axis of the measuring transducer imaginarily connecting the fourth flow opening of the first flow divider with the fourth flow opening of the second flow divider;

the measuring tubes being embodied and arranged in the measuring transducer, that the tube arrangement exhibits lying both between the first measuring tube and the third measuring tube and between the second measuring tube and the fourth measuring tube a first imaginary longitudinal-section plane, and that the tube arrangement exhibits perpendicular to its imaginary first longitudinal-section plane and extending both between the first measuring tube and second measuring tube and between the third measuring tube and fourth measuring tube a second imaginary longitudinal-section plane, and that the tube arrangement exhibits a natural bending oscillation mode of first type, in which mode:

the first measuring tube and the second measuring tube execute, relative to the second imaginary longitudinal section plane, opposite equal bending oscillations about, in each case, a static rest position associated with the respective measuring tube; and the third measuring tube and the fourth measuring tube execute, relative to the second imaginary longitudinal section plane, opposite equal bending oscillations about, in each case, a static rest position associated with the respective measuring tube, wherein:

in said natural bending oscillation mode of first type, said bending oscillations of the first measuring tube are also opposite equal to said bending oscillations of the third measuring tube, relative to the second imaginary longitudinal section plane; and said bending oscillations of the second measuring tube are also opposite equal to said bending oscillations of the fourth measuring tube, relative to the second imaginary longitudinal section plane; and the exciter mechanism is adapted to excite the bending oscillation mode of first type.

2. The measuring transducer as claimed in claim 1, wherein:

the tube arrangement exhibits a natural bending oscillation mode of second type, in which the first measuring tube and the second measuring tube execute, relative to the second imaginary longitudinal section plane, opposite equal bending oscillations about, in each case, a static rest position associated with the respective measuring tube, and the third measuring tube and the fourth measuring tube execute, relative to the second imaginary longitudinal section plane, opposite equal bending oscillations about, in each case, a static rest position associated with the respective measuring tube; wherein:

in said natural bending oscillation mode of second type, said bending oscillations of the first measuring tube are also opposite equal to said bending oscillations of the fourth measuring tube, relative to the second imaginary longitudinal section plane; and said bending oscillations of the second measuring tube are also opposite equal to said bending oscillations of the third measuring tube, relative to the second imaginary longitudinal section plane.

3. The measuring transducer as claimed in claim 2, wherein:

an eigenfrequency of the bending oscillation mode of first type differs from an eigenfrequency of the bending oscillation mode of second type.

4. The measuring transducer as claimed in claim 2, wherein:

the exciter mechanism is adapted to excite the bending oscillation mode of second type.

5. The measuring transducer as claimed in claim 1, wherein:

the two flow dividers are so embodied and arranged in the measuring transducer, that a first imaginary longitudinal section plane of the measuring transducer, within which the first imaginary connecting axis and the second imaginary connecting axis extend, is parallel to a second imaginary longitudinal section plane of the measuring transducer, within which the imaginary third connecting axis and the imaginary fourth connecting axis extend.

6. The measuring transducer as claimed in claim 5, wherein:

the two flow dividers are so embodied and arranged in the measuring transducer, that a third imaginary longitudinal section plane of the measuring transducer, within which the imaginary first connecting axis and the imaginary third connecting axis extend, is parallel to a fourth imaginary longitudinal section plane of the measuring transducer, within which the imaginary second connecting axis and the imaginary fourth connecting axis extend.

7. The measuring transducer as claimed in claim 6, wherein:

the measuring tubes are so embodied and arranged in the measuring transducer, that the second imaginary longitudinal section plane of the tube arrangement extends between the third imaginary longitudinal section plane of the measuring transducer and the fourth imaginary longitudinal section plane of the measuring transducer.

8. The measuring system as claimed in claim 1, wherein:

the tube arrangement exhibits an imaginary cross sectional plane perpendicular both to the first imaginary longitudinal section plane as well as also to the second imaginary longitudinal section plane.

9. The measuring transducer as claimed in claim 8, wherein:

each of the four measuring tubes exhibits a measuring tube peak, defined as greatest perpendicular distance of the respective measuring tube from the first imaginary longitudinal section plane, and the imaginary cross sectional plane cuts each of the four measuring tubes in its respective measuring tube peak.

10. The measuring transducer as claimed in claim 1, wherein:

the first measuring tube exhibits a caliber, which equals a caliber of the second measuring tube.

11. The measuring transducer as claimed in claim 1, wherein:

each of the four measuring tubes exhibits a caliber which amounts to more than 40 mm.

12. The measuring transducer as claimed in claim 1, wherein:

a middle segment of the transducer housing is formed at least partially by means of a straight support tube.

13. The measuring transducer as claimed in claim 1, further comprising:

a sensor arrangement reacting to vibrations of the measuring tubes for producing oscillation signals representing vibrations.

14. A measuring system for measuring at least one of: density and mass flow rate of a medium flowing, at least at times, in a pipeline, said measuring system comprising:

a measuring transducer as claimed in claim 1; and a transmitter electronics electrically coupled with the measuring transducer for activating the measuring transducer and for evaluating oscillation signals delivered by the measuring transducer.

15. The measuring system as claimed in claim 14, wherein:

the four measuring tubes, excited by the exciter mechanism, execute, during operation, simultaneously, bending oscillations in said bending oscillation fundamental mode of first type.

16. The measuring system as claimed in claim 15, wherein:

the transmitter electronics, based on electrical excitation power converted in the exciter mechanism, generates a viscosity measured value representing viscosity of the flowing medium.

17. The use of a measuring transducer as claimed in claim 1 for measuring density, mass flow rate, viscosity and Reynolds number of a medium flowing in a process line.

18. The use of a measuring system as claimed in claim 14 for measuring density, mass flow rate, viscosity and Reynolds number of a medium flowing in a process line.

19. Measuring transducer as claimed in claim 1, wherein the four measuring tubes are of equal construction relative to at least one of: a material of their tube walls, and their geometric tube dimensions.

20. Measuring transducer as claimed in claim 1, wherein a material of the tube walls of the four measuring tubes at least partially comprises at least on of: titanium, zirconium, stainless steel, duplex steel and super duplex steel.

21. Measuring transducer as claimed in claim 1, wherein the transducer housing, the flow dividers and tube walls of the measuring tubes, in each case, comprise steel.

\* \* \* \* \*